United States Patent
Arora et al.

(10) Patent No.: US 10,347,281 B2
(45) Date of Patent: Jul. 9, 2019

(54) STRUCTURES AND METHODS FOR TEMPLATED GROWTH OF HIGH AREAL DENSITY HEAT ASSISTED MAGNETIC RECORDING MEDIA

(71) Applicant: HGST Netherlands B.V., Amsterdam (NL)

(72) Inventors: Hitesh Arora, Fremont, CA (US); Bruce Gurney, San Jose, CA (US); Olav Hellwig, San Jose, CA (US); Jodi Mari Iwata, Santa Clara, CA (US); Tiffany Suzanne Santos, Palo Alto, CA (US); Dieter K. Weller, San Jose, CA (US); Frank Zhu, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 701 days.

(21) Appl. No.: 14/728,871

(22) Filed: Jun. 2, 2015

(65) Prior Publication Data

US 2016/0358622 A1    Dec. 8, 2016

(51) Int. Cl.
| | | |
|---|---|---|
| G11B 5/66 | (2006.01) | |
| G11B 5/855 | (2006.01) | |
| G11B 5/74 | (2006.01) | |
| G11B 5/00 | (2006.01) | |

(52) U.S. Cl.
CPC .............. G11B 5/855 (2013.01); G11B 5/746 (2013.01); *G11B 2005/0021* (2013.01)

(58) Field of Classification Search
CPC ........... G11B 5/855; G11B 5/85; G11B 5/851; G11B 2005/0021; C23C 14/04; C23C 14/046; C23C 16/04; C23C 16/045
See application file for complete search history.

(56) References Cited

U.S. PATENT DOCUMENTS

| | | | |
|---|---|---|---|
| 8,021,771 B2 | 9/2011 | Weller et al. | |
| 8,367,164 B2 * | 2/2013 | Kim ....................... | G11B 5/855 427/128 |
| 2006/0002026 A1 * | 1/2006 | Stipe ....................... | G11B 5/65 360/135 |
| 2010/0246062 A1 * | 9/2010 | Albrecht ................ | B82Y 10/00 360/131 |
| 2012/0052330 A1 | 3/2012 | Takekuma et al. | |
| 2012/0113768 A1 * | 5/2012 | Kanbe .................. | G11B 5/6088 369/13.24 |

(Continued)

OTHER PUBLICATIONS

USPTO Office Action for U.S. Appl. No. 14/674,185, dated Mar. 14, 2017, 10 pages.

(Continued)

*Primary Examiner* — Holly C Rickman

(57) ABSTRACT

Methods are disclosed for increasing areal density in Heat Assisted Magnetic Recording (HAMR) data storage systems by controlling the media layer grain size, grain size distribution, and pitch via templating techniques that are compatible with the high temperature HAMR media deposition. Embodiments include using current HAMR media seed layers as well as additionally introduced interlayers for the templating process. Topographic as well as chemical templating methods are disclosed that may employ nanoimprint technology or nanoparticle self-assembly among other patterning techniques.

21 Claims, 22 Drawing Sheets

(56) References Cited

U.S. PATENT DOCUMENTS

| | | |
|---|---|---|
| 2013/0314815 A1 | 11/2013 | Yuan et al. |
| 2014/0093748 A1 | 4/2014 | Chen et al. |
| 2014/0099517 A1* | 4/2014 | Hu .................. G11B 5/8404 428/831 |
| 2014/0233363 A1 | 8/2014 | Kryder et al. |
| 2015/0017481 A1* | 1/2015 | Nolan ................ G11B 5/855 428/831.2 |
| 2016/0155460 A1* | 6/2016 | Srinivasan ........... G11B 5/7325 360/235.4 |
| 2016/0293195 A1 | 10/2016 | Liu et al. |
| 2016/0358622 A1 | 12/2016 | Arora et al. |

OTHER PUBLICATIONS

Microstructure and magnetic properties of FePt—TiC—C granular thin films for perpendicular recording www.sciencedirect.com/science/article/pii/S0038109813005140.

Atomic resolution structure-property relation in highly anisotropic granular FePt—C films with near-Stoner-Wohlfarth behaviour http://pisana.lab.yorku.ca/files/2014/08/JAP-Atomic-Resolution-Structure-FePt.pdf.

Microstructure control of FePt films for HAMR http://www.nus.edu.sg/ngs/Research%20Projects/NUS/Chen_Jingsheng_1.pdf.

* cited by examiner

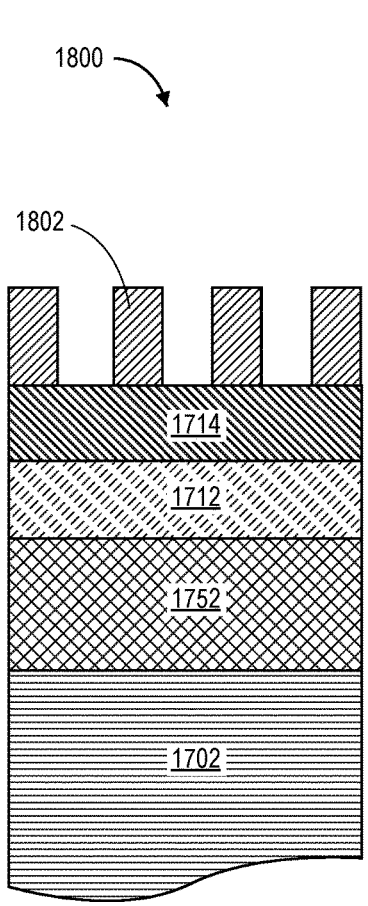 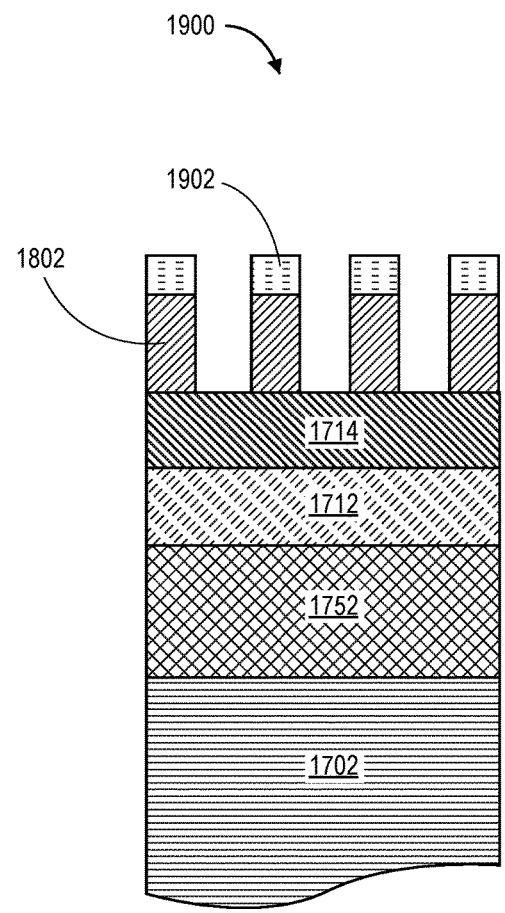
FIG. 18      FIG. 19

STRUCTURES AND METHODS FOR TEMPLATED GROWTH OF HIGH AREAL DENSITY HEAT ASSISTED MAGNETIC RECORDING MEDIA

TECHNICAL FIELD

The present invention relates to data storage devices and in particular to data storage devices employing heat assisted magnetic recording (HAMR) with very high areal data storage densities.

BACKGROUND

Data storage devices employ rotating data storage media such as hard disk drives. In a hard disk drive, data is written to the disk medium using a write head which generates a high localized magnetic field that aligns magnetic domains within the disk in one of two directions. In some cases, the magnetization direction is up or down relative to the plane of the disk (perpendicular magnetic recording, or PMR). In other cases, the magnetization direction is within the plane of the disk. In all cases, this data may then be read-out with a read head. The write and read heads are typically integrated within a single assembly. To achieve steadily increasing data storage densities (typically measured in bits/inch), which are now at levels near $10^{12}$ bits/in$^2$ (1 Tb/in$^2$), the sizes of the recording magnetic regions on the disk have been reduced to nm levels.

The dimensions of magnetic grains are being steadily decreased by modifying the seed layer in order to reduce the distribution ($\sigma_D$) [where the "D" denotes diameter] of magnetic grain sizes to levels below 10 to 15% (where $\sigma_D$ is a percent of the mean diameter <D>). Current HAMR media preferably employ a co-deposited granular $L1_0$ FePt—X, FePd—X, FePtAg—X, FePtAu—X, FePtCu—X, FePtNi—X, MnAl—X, etc., or $L1_1$ ordered CoPt—X, CoPd—X, etc. layer, where X are segregants including C, SiO$_x$, TiO$_x$, SiN$_x$, BN$_x$, B$_2$O$_3$ and other nitrides, oxides, borides, and/or carbides. Typical percentages of the co-deposited (typically by sputtering) segregants are in the range of 15 to 50 atomic %. Depositions are done at elevated temperatures in the range 300 to 700° C. to ensure that the highly anisotropic ($K_u$) chemically ordered $L1_0$ phase is formed in a chemical ordering transition from an initially isotropic A1 phase (see FIG. 3). FIG. 2 illustrates a typical HAMR media design. In the embodiments disclosed herein, it is individual magnetic grains which are patterned, where there will typically be approximately 8 to 15 grains per bit, although embodiments with approximately 4 to 10 grains per bit are also possible for higher storage densities. Thus no write synchronization is required since the magnetic grain patterning is not directly correlated with the sizes or locations of data storage bits on the medium. Since the size ranges of magnetic grains are decreased by embodiments of the invention, the signal-to-noise ratio may be improved, enabling smaller data storage bits leading to higher areal densities.

Thus it would be advantageous in a data storage system to reduce the grain size distribution to levels below 10 to 15%.

It is further advantageous to enable the growth of highly uniaxial perpendicular anisotropic magnetic material on a template capable of withstanding temperatures as high as 700° C.

It would also be advantageous to create data storage media with small thermally stable columnar grains which are chemically distinct and isolated.

It would be still more advantageous to control both the grain size and grain size distribution of FePt or other high uniaxial perpendicular anisotropy magnetic materials employed in HAMR media.

SUMMARY

Embodiments of the present invention provide methods for improved control of the grain size and the grain size distribution by using pre-defined topographical features such as patterned surfaces to create nucleation sites for high temperature depositions of high anisotropy HAMR media. The sizes and size distributions of these features are controlled by templates used to form these features. Examples of templates include patterned media templates or monodisperse, nanoparticle arrays. By preserving the surface properties of these features, they introduce heteroepitaxial strain resulting in the high anisotropy direction aligned out-of-plane, creating nucleation sites for HAMR media (including $L1_0$ ordered FePt, FePd, FePtAg, FePtAu, FePtCu, FePtNi, MnAl and $L1_1$ ordered CoPt, CoPd) formed by subtractive processes, additive processes, or a combination of both subtractive and additive processes.

A goal of some embodiments is to grow high uniaxial perpendicular anisotropic magnetic material at elevated temperatures on a patterned template, where "perpendicular" is defined as the direction away from the plane of the surface of the storage medium.

A goal of some embodiments is to reduce the grain size distribution to levels below 10 to 15%. A patterned template is used to control the size and distribution of grain growth.

Another goal of some embodiments is to grow grains which are chemically distinct and isolated from each other.

A further goal of some embodiments is to create data storage media with small thermally stable columnar grains.

A still further goal of some embodiments is to control both the grain size and grain size distribution of FePt or other high uniaxial perpendicular anisotropy magnetic materials employed in HAMR media.

BRIEF DESCRIPTION OF THE DRAWINGS

FIG. 18 is a schematic diagram of an intermediate step in a templated growth process for a HAMR storage medium with a patterned metal seed layer;

FIG. 19 is a schematic diagram of a final step in a templated growth process for a HAMR storage medium with a patterned metal seed layer;

DETAILED DESCRIPTION

Embodiments can provide one or more advantages over previous methods for improving areal storage densities in a HAMR data storage system. The embodiments will be described with respect to these benefits, but these embodiments are not intended to be limiting. Various modifications, alternatives, and equivalents fall within the spirit and scope of the embodiments herein and as defined in the claims.

Data Storage System Embodying the Present Invention

Figure 1:
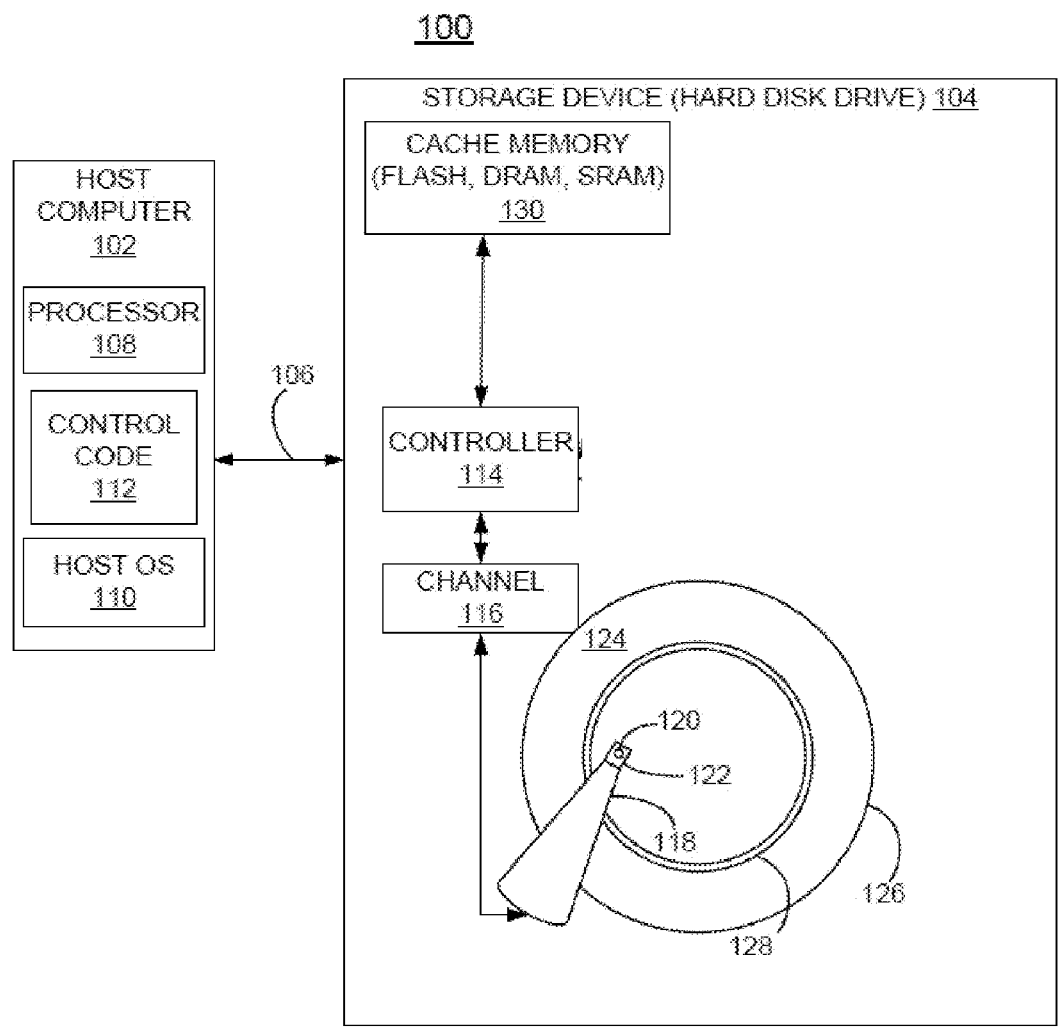
FIG. 1 is a schematic diagram of a data storage system according to the present invention.

FIG. 1 is a schematic diagram of a data storage system 100 embodying the present invention. System 100 includes a host computer 102, a storage device 104, such as a hard disk drive (HDD), and an interface 106 between the host computer 102 and the storage device 104. Host computer 102 includes a processor 108, a host operating system (OS) 110, and control code 112. The storage device or HDD 104 includes controller 114 coupled to a data channel 116. The storage device 104 includes an arm 118 carrying a read/write head including a read element 120 and a write element 122.

In operation, host operating system 110 in host computer 102 sends commands to storage device 104. In response to these commands, storage device 104 performs requested functions such as reading, writing, and erasing data on disk 126. Controller 114 causes write element 122 to record magnetic patterns of data on a writable surface of disk 124 in tracks 128. The controller 114 positions the read head 120 and write head 122 over the recordable or writable surface 124 of disk 126 by locking a servo loop to predetermined servo positioning burst patterns, typically located in servo spokes or zones. The predetermined servo positioning pattern may include a preamble field, a servo sync-mark (SSM) field, a track/sector identification (ID) field, a plurality of position error signal (PES) fields, and a plurality of repeatable run out (RRO) fields following the burst fields. In accordance with some embodiments of the invention, system 100 includes a cache memory 130, for example, implemented with one or more of: a flash memory, a dynamic random access memory (DRAM), or a static random access memory (SRAM).

System 100 including the host computer 102 and the storage device or HDD 104 is shown in simplified form sufficient for understanding the present invention. The illustrated host computer 102 together with the storage device or hard disk drive 104 is not intended to imply architectural or functional limitations. The present invention may be used with various hardware implementations and systems and various other internal hardware devices.

Basic Granular HAMR Data Storage Medium Design

Figure 2:
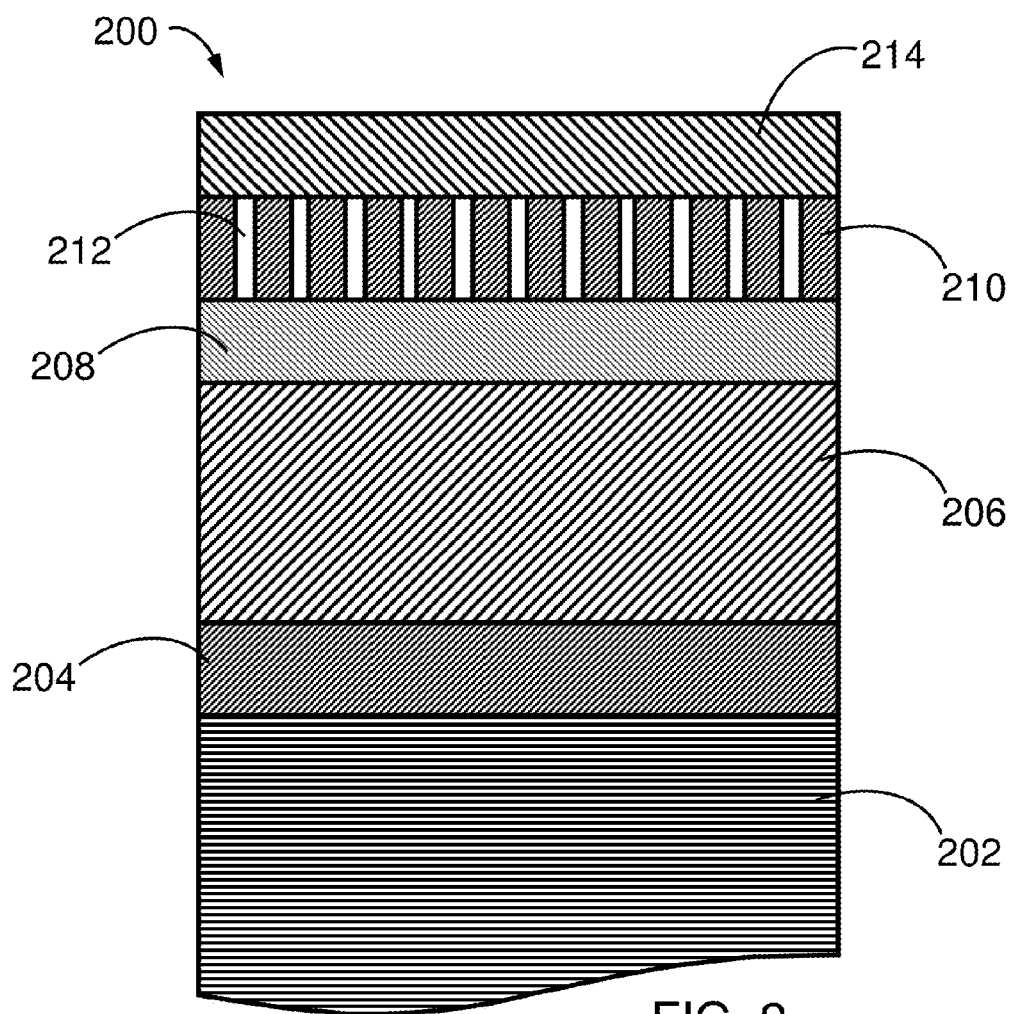
FIG. 2 is a schematic side view diagram of a basic granular HAMR media design.

FIG. 2 is a schematic side view diagram 200 of a basic granular HAMR media design as is familiar to those skilled in the art. The storage medium fabrication process typically begins with a high temperature glass disk 202, onto which a magnetic or non-magnetic adhesion layer 204 is deposited, typically comprising 10-200 nm of an amorphous adhesion layer material, CrTa, NiTa, or an amorphous soft underlayer (SUL)-like material such as CoFeZrB, CoTaZr, CoCrZr, CoFeTaZr, CoFeZrBW, or any combination of these materials. Next, a combined heat sink and plasmonic underlayer 206 is deposited, typically comprising 5 to 200 nm of Ag, Al, Cu, Cr, Au, NiAl, NiTa, Ru, RuAl, W, Mo, Ta or any combination of these materials. A third deposition creates a thin seed layer 208, which can also act as a thermal barrier, typically comprising 2 to 50 nm MgO, TiN, SrTiO$_3$, MgTi-oxide, and/or MgO$_x$—SiO$_x$ for which the 002 crystallographic orientation is chosen to determine the subsequent crystallographic orientation of a 002-oriented FePt layer whose growth is controlled by the seed layer. The use of seed layers to control the growth of magnetic data storage layers is familiar to those skilled in the art. Finally, a fourth layer of co-deposited L1$_0$ FePt, FePd, FePtAg, FePtAu, FePtCu, FePtNi, MnAl, and/or L1$_1$ CoPt, CoPd, etc. 210 and a segregant 212 is formed using a high temperature deposition. Segregants may typically comprise one or more of C, SiO$_x$, TiO$_x$, SiN$_x$, BN$_x$, B$_2$O$_3$ and other nitrides, oxides, borides, and/or carbides. During this fourth deposition, the function of the segregant is to cause the HAMR material to separate out ideally into columnar (~3-12 nm diameter) grains with uniform size distribution. These grains should be chemically distinct and isolated due to the segregant surrounding each grain to prevent contact between neighboring grains. The distribution of grain sizes in the HAMR layer may be characterized by two parameters: grain diameter and grain pitch, corresponding to the spacing between the centers of neighboring grains. Grain diameters have a mean value <D> with a standard deviation $\sigma_D$, which is typically calculated while excluding grains smaller than ~4 nm since these smaller grains cannot be used to store data due to their very low coercivity and thermal instability (see FIG. 12). The grain pitch has a mean value <P> with a standard deviation $\sigma_P$. One pathway for improvement is to reduce the two standard deviations to below 10 to 15% of the respective mean values, i.e. to make $\sigma_D$<[0.10 to 0.15<D>] and to make $\sigma_P$<[0.10 to 0.15<P>]. Finally, a carbon overcoat layer 214 is deposited to cover the layer with grains 210 and segregant 212. The terms "grain size" and "grain diameter" are used interchangeably, and correspond to the distance from one grain edge to an opposing grain edge. The term "grain pitch" refers to the distance between the center of a grain and the center of a neighboring grain. The grain size distribution corresponds to the range of measured grain sizes or grain diameters in a deposited magnetic storage medium. The grain pitch distribution corresponds to the range of measured grain pitches in a deposited magnetic storage medium. Between neighboring grains, there will always be a segregant material typically with a thickness ranging from 0.5 to 2.0 nm which magnetically isolates neighboring grains.

Figure 3:
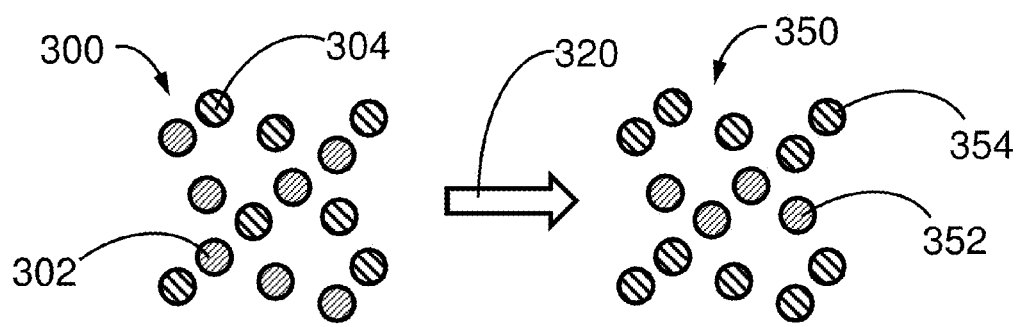
FIG. 3 is a schematic diagram of an A1 to $L1_0$ chemical ordering transition.

FIG. 3 is a schematic diagram of an A1 to $L1_0$ chemical ordering transition. Initially, a film deposited at room temperature comprising co-deposited FePt, FePd, FePtAg, FePtAu, FePtCu, FePtNi, MnAl, CoPt, CoPd, etc. and a segregant will have no chemical ordering (phase A1 with chemical ordering parameter S~0), corresponding to view 300, with lattice sites randomly containing, for example, either Fe 302 or Pt 304 atoms. After heating to 300 to 700° C., a chemical ordering transition 320 occurs, leading to the layered superlattice in view 350, wherein layers of Fe atoms 352 alternate with layers of Pt atoms 354. Such layered structures are characterized by substantially different magnetic properties perpendicular and parallel to the atomic layers 352 and 354. The chemical ordering parameter for a superlattice in which layers have only one type of atom is defined as S=1.0, i.e. full 100% chemical ordering.

Granular HAMR Media with Larger Grains

Figure 4:
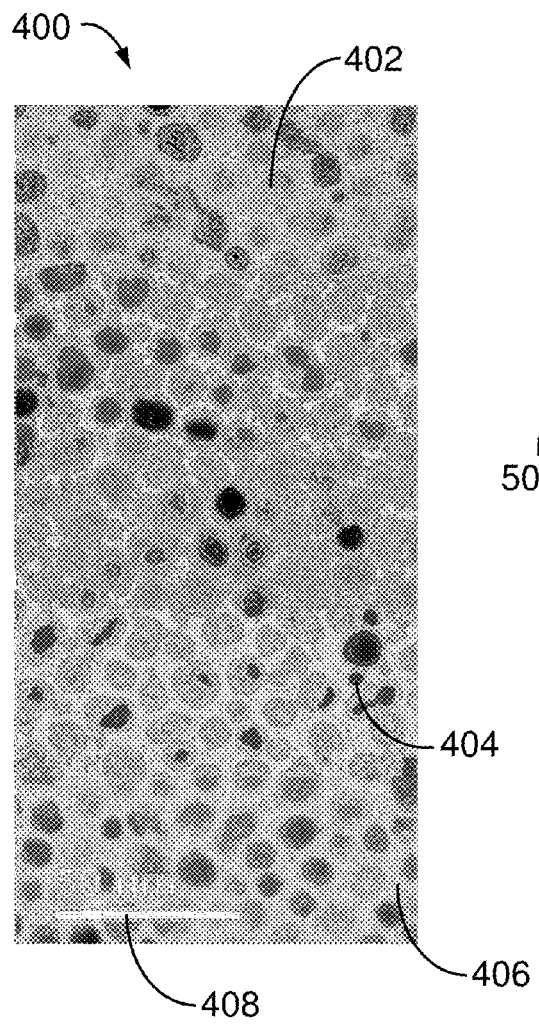
FIG. 4 is a plan view TEM micrograph of a granular HAMR medium with larger grains.
Figure 6:
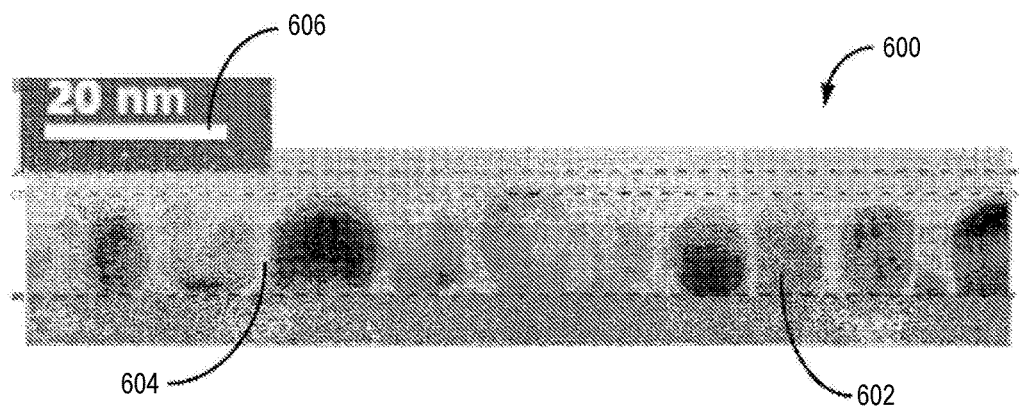
FIG. 6 is a side view TEM micrograph of a granular HAMR medium with larger grains.

FIG. 4 is a plan view TEM micrograph 400 of a granular HAMR medium with larger grains. A larger grain 402 and a smaller grain 404 may be seen, along with regions of segregant 406 which completely surround the grains thereby making them chemically distinct and isolated. A scale bar 408 corresponds to 50 nm. FIG. 6 is a side view TEM micrograph 600 of the granular HAMR medium from FIG. 4. A grain 602 may be seen, along with a segregant region 604 and a 20 nm scale bar 606.

Figure 8:
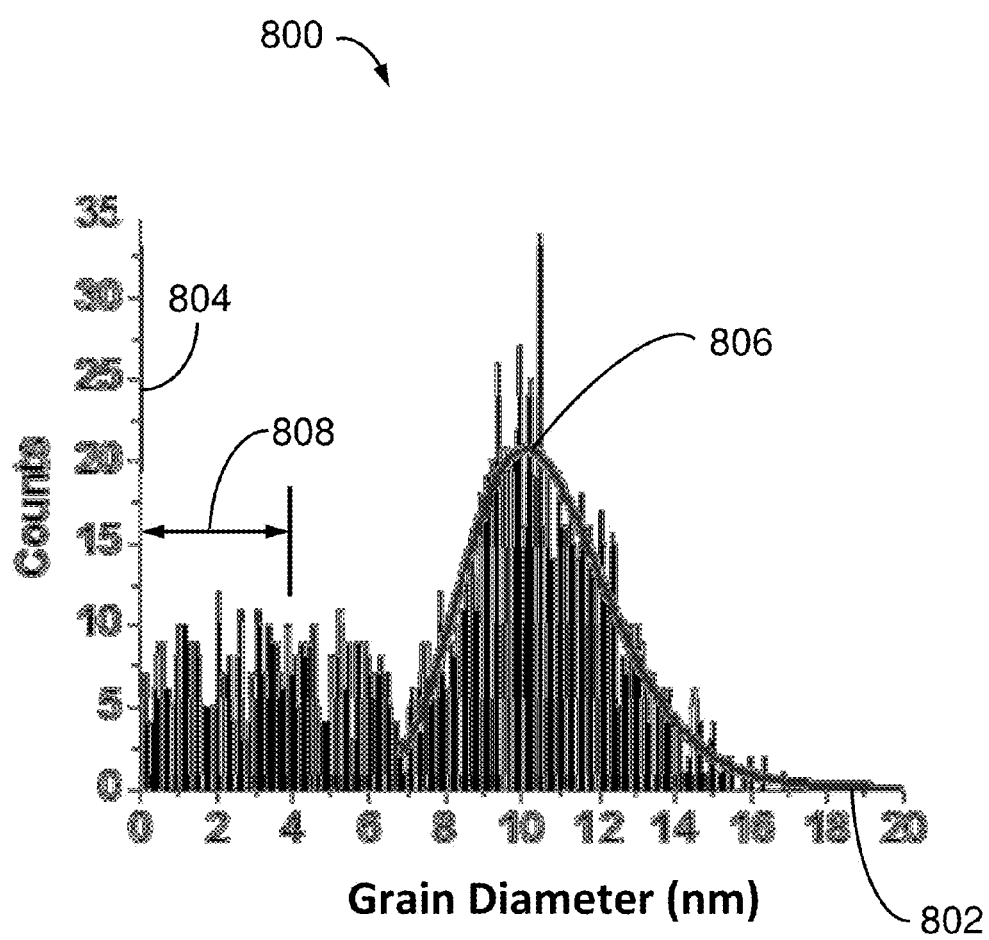
FIG. 8 is a histogram of the grain size distribution for a HAMR medium with larger grains.

FIG. 8 is a histogram 800 of the grain size distribution for the HAMR medium shown in FIGS. 4 and 6. The number of counts 804 for various grain diameters 802 is shown—the maximum 806 of the distribution is 10.4 nm grain diameter, with a large standard deviation $\sigma_D$ of 18%. The region 808 of grain diameters smaller than ~4 nm is neglected since these small grains have low coercivities (see FIG. 12) and thus cannot store data (since they will not remain magnetized in any direction reliably).

Granular HAMR Media with Smaller Grains

Figure 5:
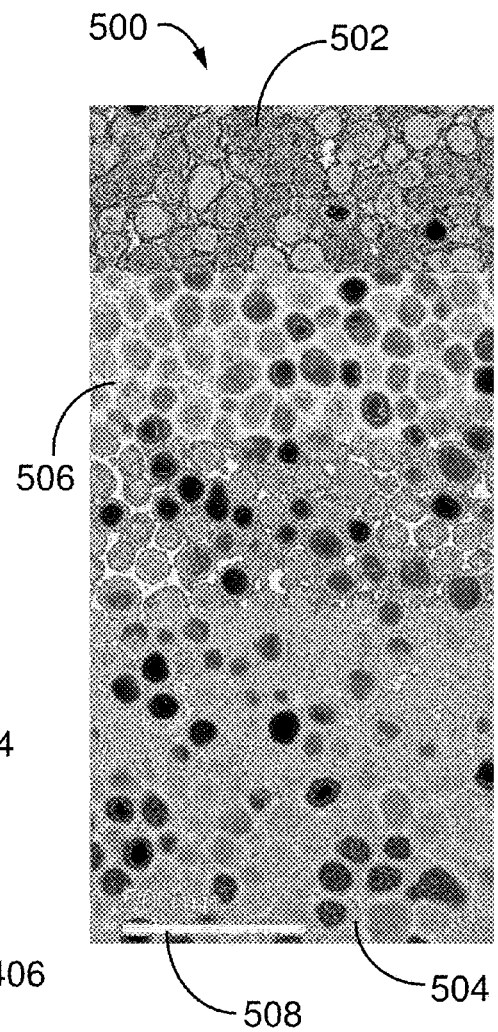
FIG. 5 is a plan view TEM micrograph of a granular HAMR medium with smaller grains.
Figure 7:
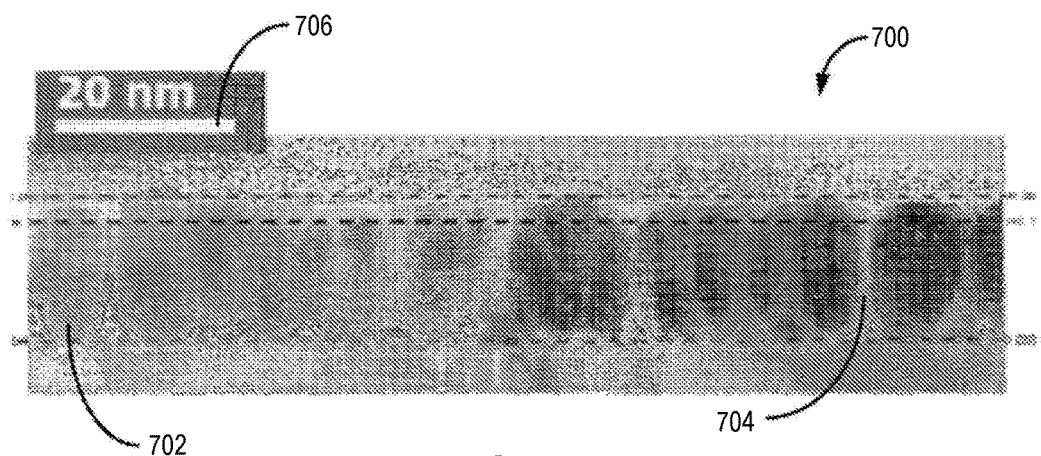
FIG. 7 is a side view TEM micrograph of a granular HAMR medium with smaller grains.

FIG. 5 is a plan view TEM micrograph 500 of a granular HAMR medium with smaller grains and a reduced number of grains with diameters smaller than ~4 nm, corresponding to improvements from the process used to fabricate the HAMR medium with larger grains and a high number of grains smaller than ~4 nm in FIGS. 4, 6, and 8. A larger grain 502 and a smaller grain 504 may be seen, along with regions of segregant 506 which completely surround the grains thereby making them chemically distinct and isolated. A scale bar 508 corresponds to 50 nm. FIG. 7 is a side view TEM micrograph 700 of the granular HAMR medium from FIG. 5. A grain 702 may be seen, along with a segregant region 704 and a 20 nm scale bar 706.

Figure 9:
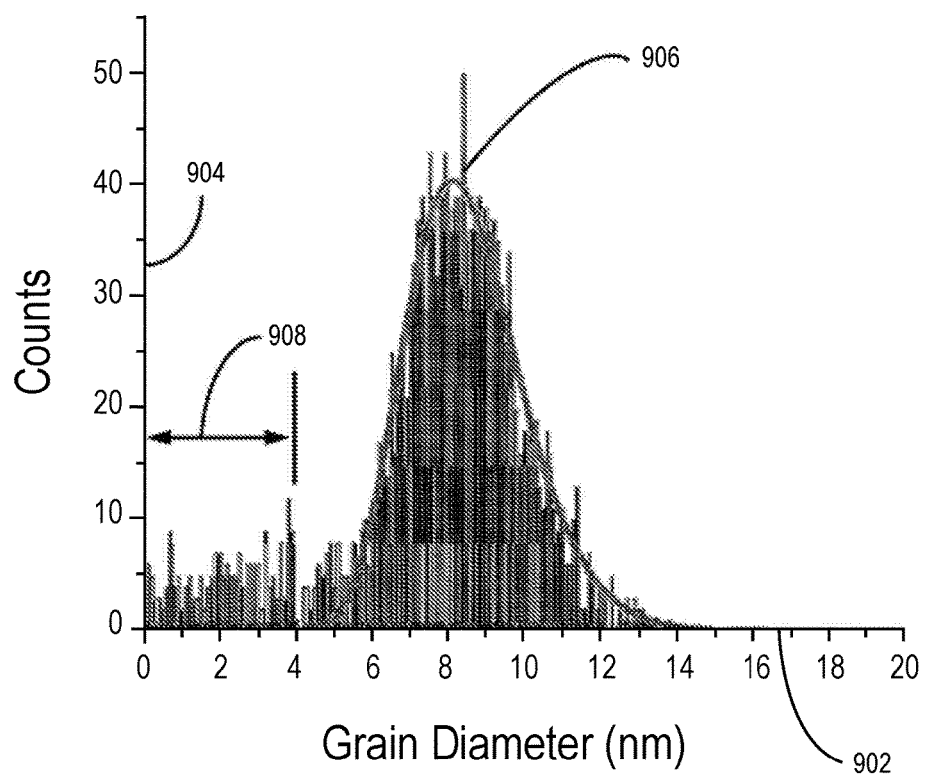
FIG. 9 is a histogram of the grain size distribution for a HAMR medium with smaller grains.

FIG. 9 is a histogram 900 of the grain size distribution for the HAMR medium shown in FIGS. 5 and 7. The number of counts 904 for various grain diameters 902 is shown—the maximum 906 of the distribution is 8.4 nm grain diameter, with no change in standard deviation $\sigma_D$ (18%) compared with FIG. 8. The region 908 of grain diameters smaller than ~4 nm is neglected as for FIG. 8. Comparison of FIGS. 8 and 9 shows that the most likely grain diameter (i.e., the mode of the distribution) has been reduced from 10.4 nm to 8.4 nm, and the frequency of grains with diameters less than ~4 nm has been reduced. However, the standard deviation of the distribution did not change.

As the grain sizes are made smaller, the variation, $\sigma_P$, in grain pitch, P, is found to increase. Also, experiments and modeling have shown that both the chemical ordering (e.g., the extent to which the layers of Fe and Pt atoms—see view 350 in FIG. 3—contain only one atomic species) and the Curie temperatures of individual grains strongly depend on the grain size variation (see FIGS. 11-13). Smaller grains down to 4 nm reduce the chemical ordering by 10-20% (see FIG. 11), and this lower chemical ordering then reduces the Curie temperature (see FIG. 12). Combining these two correlations gives FIG. 13, showing the reduction in normalized Curie temperatures as a function of the grain size. Thus with the smaller grain sizes needed to increase the storage medium areal density (measured in Tb/in$^2$), it is critical to reduce $\sigma_D$ in order to minimize the variation in Curie temperatures, $\sigma_{TC}$, in order to ensure the thermal stability and writability of HAMR storage systems.

Magnetic Hysteresis Curves for Anisotropic HAMR Media

Figure 10:
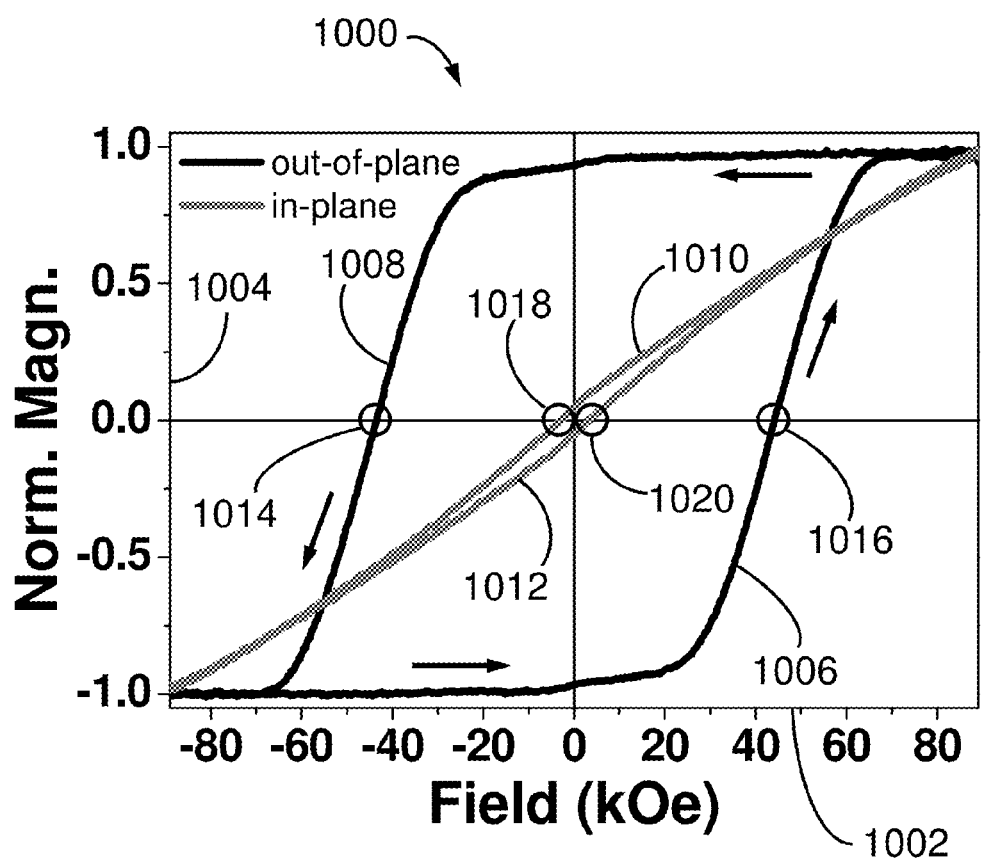
FIG. 10 is a graph of magnetization as a function of the applied magnetic field.

FIG. 10 shows a graph of the normalized magnetization 1004 as a function of the applied magnetic field 1002 (in kOersteds) for anisotropic HAMR materials (such as in view 350 in FIG. 3). In-plane (where "plane" corresponds to the surface of the storage medium), the hysteresis curve has two components: section 1010 corresponding to the change in magnetization as the field is reduced, while section 1012 corresponds to the magnetization as the field is increased. Out-of-plane, the corresponding components of the hysteresis curve are 1008 and 1006, respectively. For magnetically isotropic materials (such as view 300 in FIG. 3), the in-plane and out-of-plane hysteresis curves would be identical. For highly anisotropic superlattices, such as $L1_0$ FePt, the out-of-plane hysteresis curve shows a much higher coercivity (points 1014 and 1016) and magnetization at zero field than does the in-plane curve (points 1018 and 1020). This indicates that the magnetization direction of the grain when written to by the write head of a HAMR data storage system will tend to be roughly perpendicular to the plane of the storage medium (i.e., out-of-plane).

Figure 11:
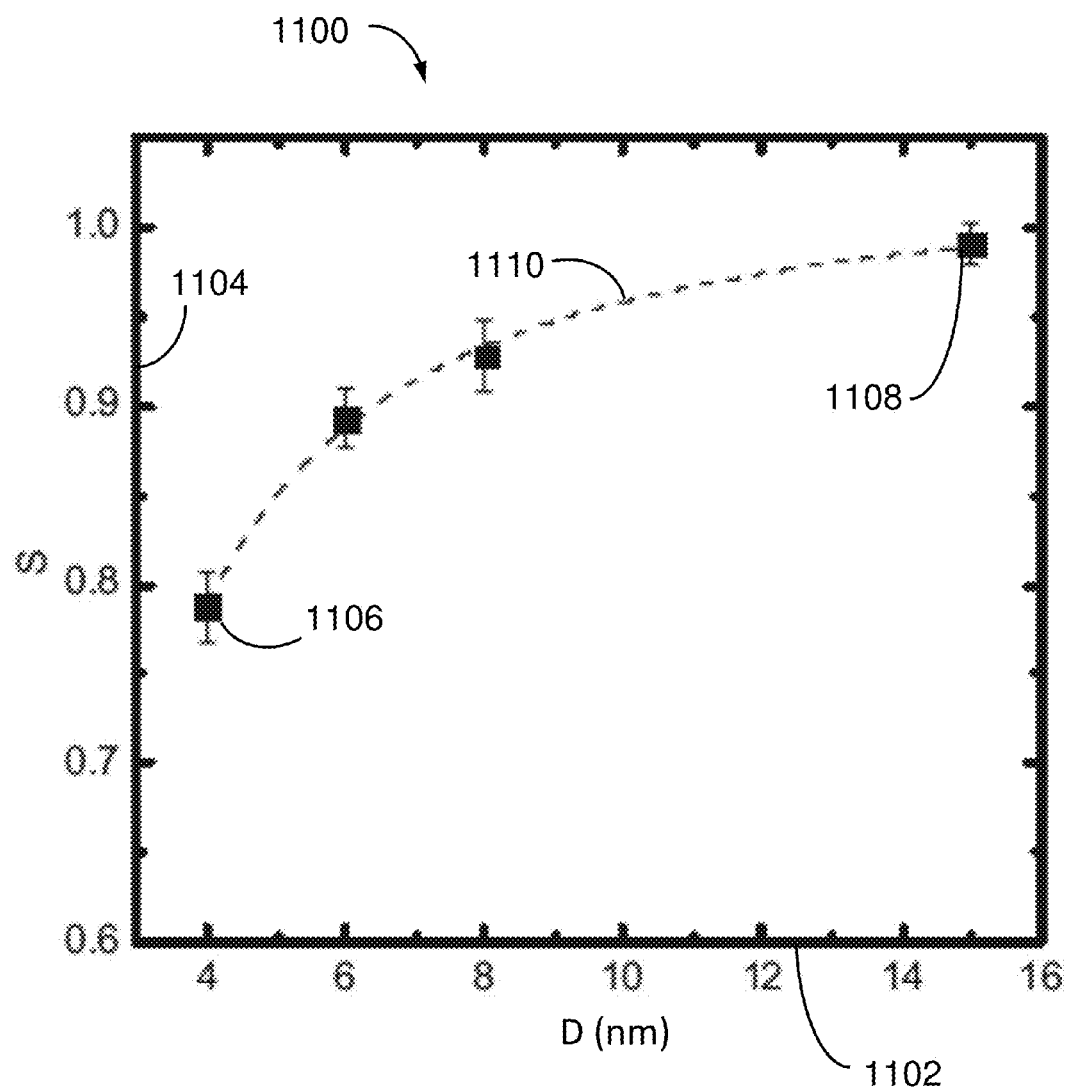
FIG. 11 is a graph of the chemical order parameter S as a function of the grain diameter D.
Figure 12:
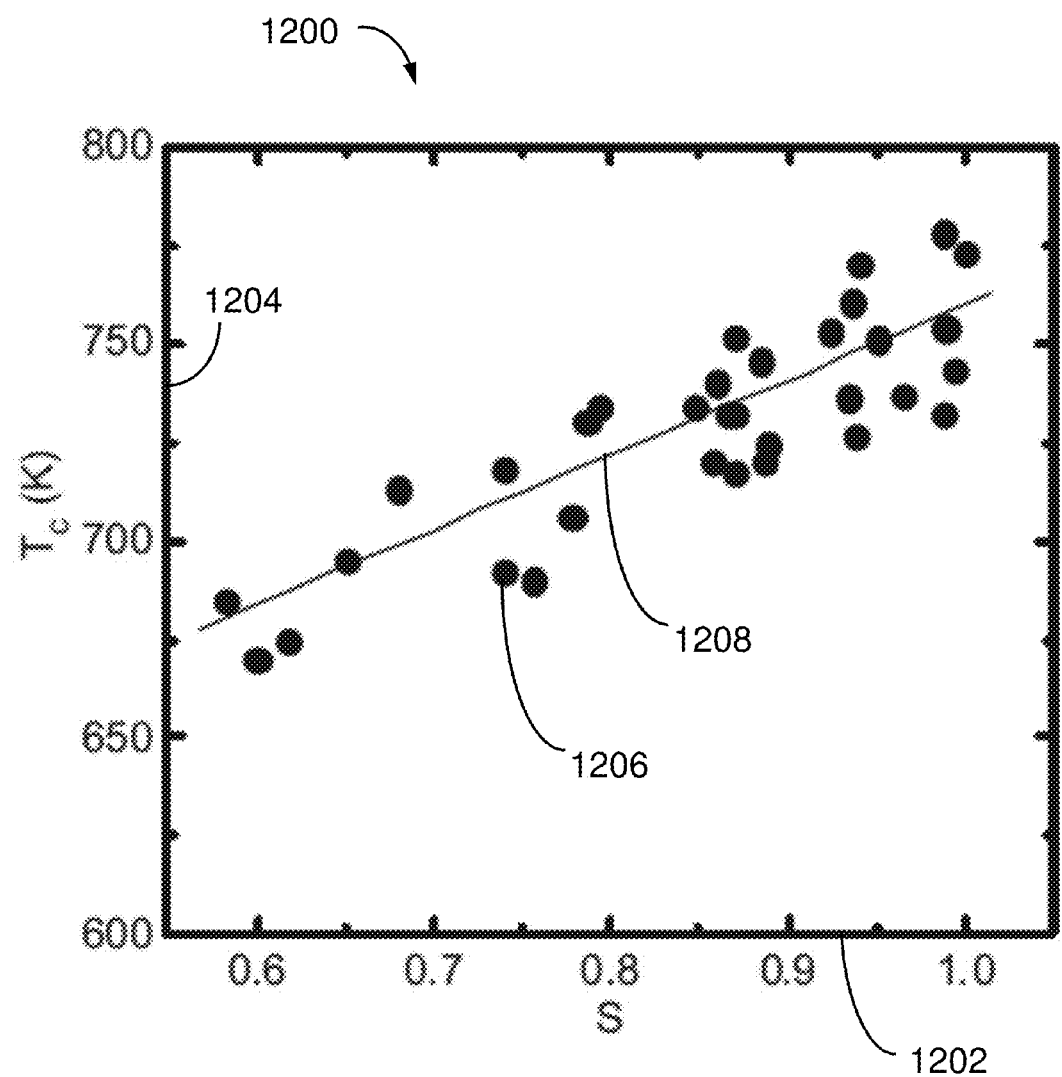
FIG. 12 is graph of the Curie temperature $T_C$ as a function of the chemical order parameter S.
Figure 13:
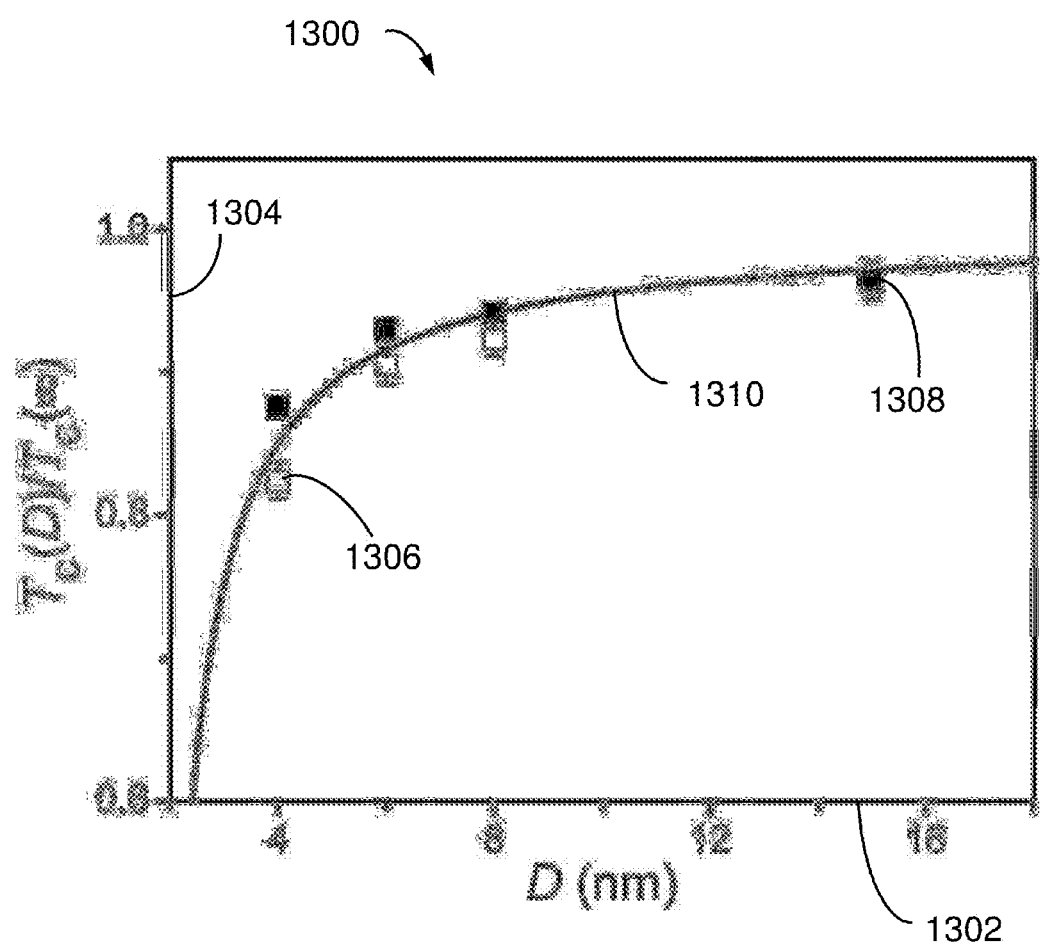
FIG. 13 is a graph of the normalized Curie temperature as a function of the grain diameter D.

Relations Between the Chemical Order Parameter, Grain Diameter, and Curie Temperature FIGS. 11-13 relate to the three parameters: chemical order S, grain diameter, and Curie temperature. As is known in the art, the Curie temperature, $T_C$, is the temperature where the magnetic moments in a material spontaneously order as the temperature goes below $T_C$. The interrelations between these three parameters influence the performance of any HAMR medium. FIGS. 11 and 12 are from C. B. Rong, et al., Adv. Mat., vol. 18, 2984 (2006). FIG. 13 is from H. M. Lu, et al., J. Appl. Phys., vol. 103, 123526 (2008).

FIG. 11 is a graph 1100 of the chemical order parameter S 1104 as a function of the grain diameter D 1102. Curve 1110 shows a monotonic decrease with decreasing grain diameters, demonstrating that the degree of chemical ordering is negatively influenced by smaller grains—this may be due to the lower ratio of surface to volume in these larger grains, since surface effects (where the Fe and Pt atoms interact with segregant atoms) may tend to act against the chemical ordering process $A1 \rightarrow L1_0$. Data point 1108 at 15 nm grain diameter shows nearly perfect chemical ordering of S=~1.0, i.e., in FIG. 3, view 350, layers 352 and 354 would each comprise essentially only a single atomic species, e.g. either Fe or Pt, but not both. Conversely, data point 1106 for 4 nm grain diameter shows much lower chemical ordering around 0.8, and below 4 nm the chemical ordering curve 1110 drops rapidly.

FIG. 12 is graph 1200 of the Curie temperature $T_C$ 1204 as a function of the chemical order parameter S 1202. Thus the horizontal axis 1202 here corresponds to the vertical axis 1104 in FIG. 11. Although there is substantial spread in the measured values 1206 for the Curie temperatures of individual grains, a linear fit 1208 shows a steady increase in Curie temperatures as a function of the chemical ordering parameter S—as is to be expected since the purpose of employing high uniaxial perpendicular anisotropy magnetic materials including superlattices like $L1_0$ or $L1_1$ is to take advantage of their substantial coercivities and remnant magnetization along the axes perpendicular to the superlattice planes.

FIG. 13 is a graph 1300 of the normalized Curie temperature 1304 as a function of the grain diameter 1302. The normalization uses the Curie temperatures, $T_C(\infty)$, for infinitely large magnetic domains which are always higher than the Curie temperatures for finite-diameter grains. Here, horizontal axis 1302 corresponds to horizontal axis 1102 in FIG. 11, while the vertical axis 1304 has been normalized relative to the vertical axis 1204 in FIG. 12. Since the relationship in FIG. 12 is linear with a small positive slope, FIGS. 11 and 13 are similar, since they are connected through FIG. 12. Curve 1310 approaches a value of S=1.0 for the largest grain diameters 1308—this corresponds to data point 1108 in FIG. 11. Data point 1306 shows a reduced normalized Curie temperature for grain diameters around 4 nm—corresponding to data point 1106 in FIG. 11. For grain diameters below 4 nm, the normalized Curie temperature may be seen to decrease rapidly.

Figure 14:
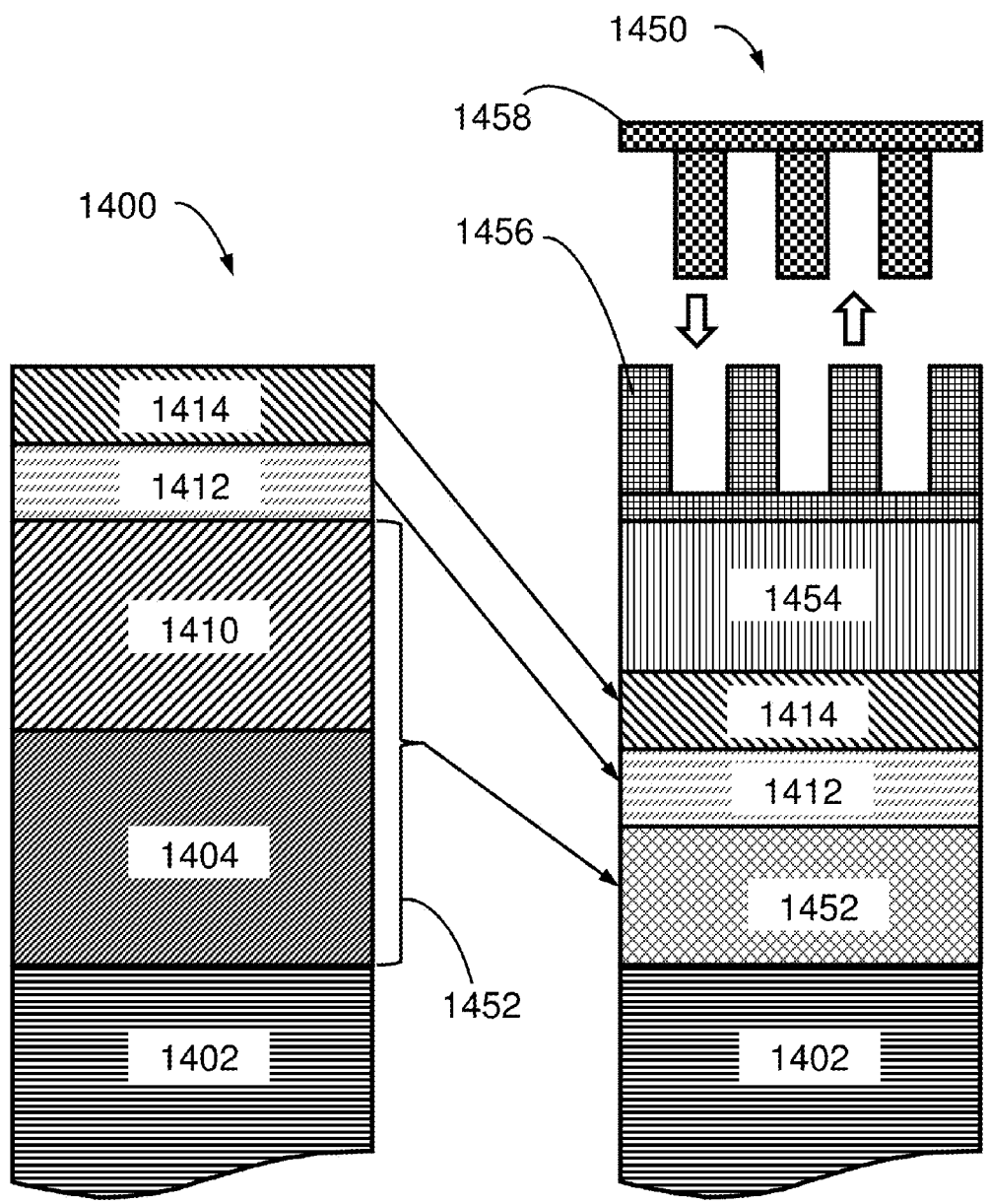
FIG. 14 is schematic diagram of initial steps in a templated growth process for a HAMR storage medium with a patterned TiN seed layer.
Figure 15:
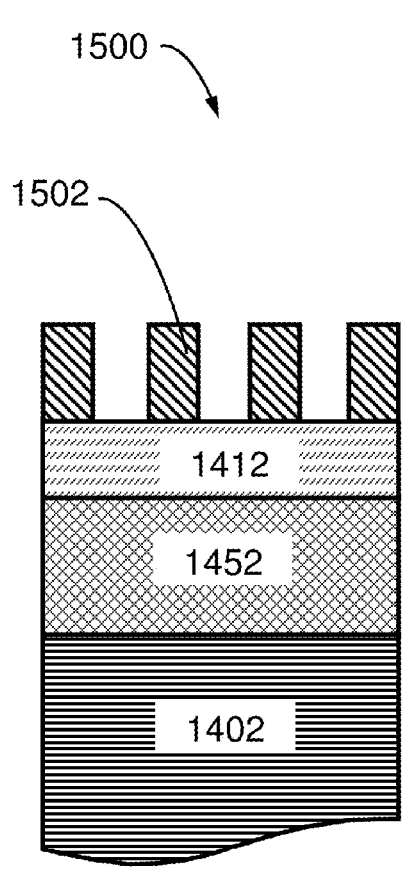
FIG. 15 is a schematic diagram of an intermediate step in a templated growth process for a HAMR storage medium with a patterned TiN seed layer.
Figure 16:
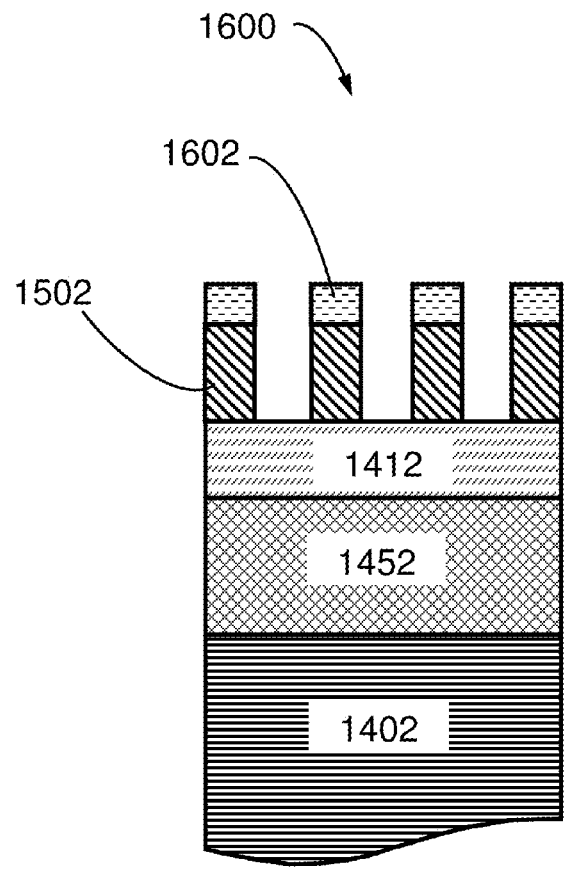
FIG. 16 is a schematic diagram of a final step in a templated growth process for a HAMR storage medium with a patterned TiN seed layer.

FIGS. 14-16: First Embodiment

FIG. 14 is schematic diagram of the initial steps 1400 and 1450 in a templated growth process for a HAMR storage medium with a patterned (002)-oriented seed layer, corresponding to a first embodiment of the present invention. A high temperature glass substrate 1402 forms a surface upon which an adhesion layer 1404 is grown, typically comprising 10 to 200 nm of an amorphous adhesion layer material, CrTa, NiTa, or an amorphous soft underlayer (SUL)-like material such as CoFeZrB, CoTaZr, CoCrZr, CoFeTaZr, CoFeZrBW, or any combination of these materials. Next a very thin seed or onset layer may optionally be deposited prior to depositing heat sink layer 1410, typically comprising 5 to 200 nm of Ag, Al, Cu, Cr, Au, NiAl, NiTa, Ru, RuAl, W, Mo, Ta or any combination of these materials. The two layers 1404 and 1410 are collectively shown as a first underlayer stack 1452 in view 1450. On top of layer 1410, a 2 to 50 nm layer 1412 of (002) oriented MgO followed by a 3 to 20 nm layer 1414 of (002) oriented TiN are deposited—both these depositions are typically at room temperature. The combination of layers 1412 and 1414 forms a second underlayer stack, wherein the second underlayer stack may comprise only layer 1412, only layer 1414, or both layers 1412 and 1414 or other layers or combinations of materials including (002) magnesium oxide, (002) titanium nitride, both (002) magnesium oxide and (002) titanium nitride, and/or combinations of materials including (002) strontium titanium-oxide, (002) magnesium titanium-oxide, and/or (002) magnesium oxide-silicon oxide. These materials may be co-deposited and/or deposited in sequential multilayer depositions to form the overall second underlayer stack. The second underlayer stack constitutes the material for the patterned seed layer 1502 in FIG. 15, thus the orientation of the second underlayer stack material is important for controlling the orientation of the HAMR storage layer 1602 grown on the patterned seed layer 1502 in FIG. 16. The second underlayer stack may comprise either one or two layers: a first upper layer and an optional second lower layer. The first upper layer is patterned to form the patterned seed layer 1502 in FIG. 15.

View 1450 in FIG. 14 shows a deposition of a hard mask layer 1454 which may comprise high density carbon, corresponding to carbon with a higher degree of $sp^3$ bonding (and a correspondingly lower degree of $sp^2$ bonding) which has characteristically higher etch contrast and higher density than more graphitic carbon (i.e., carbon with more $sp^2$ bonding). In addition to high density carbon, other possible materials for the hard mask layer comprise one or more layers of carbon nitride, boron nitride, silicon nitride, and/or silicon oxide. Following the deposition of hard mask layer 1454, a resist layer 1456 is deposited. Layer 1456 is then lithographically patterned (e.g., using imprint lithography) by an imprint template 1458. The template is pressed (downward arrow) into the resist layer 1456. After imprinting, template 1458 is pulled off the resist 1456 (upward arrow), leaving behind a pattern of raised features in the resist layer 1456, surrounded by lower features.

FIG. 15 is a schematic diagram of an intermediate step 1500 in a templated growth process for a HAMR storage medium with a patterned seed layer 1502 following the steps shown in FIG. 14. Here, an ion milling step has been used to transfer the pattern in resist layer 1456 down through the hard mask layer 1454 and through the seed layer 1414 to form patterned seed layer 1502. The seed layer 1414 comprises the material deposited to form the first layer in the second underlayer stack. After this patterning process is complete, the remainder of the resist layer 1456 and the hard mask layer 1454 are removed, exposing a set of seed layer pillars 1502 with the proper crystallographic orientation for subsequent growth of the HAMR layer 1602 in FIG. 16. If a second layer is present in the second underlayer stack, it is not patterned, and remains as a continuous unpatterned layer 1412 underneath the patterned seed layer 1502 as illustrated in FIG. 15.

FIG. 16 is a schematic diagram of the final step 1600 in a templated growth process for a HAMR storage medium with a patterned seed layer 1502, typically comprising (002) TiN, MgO, $SrTiO_3$, MgTi-oxide, and/or $MgO_x$—$SiO_x$ as characterized in FIG. 14. A key requirement for the seed layer 1502 is the ability to withstand high temperature depositions. The HAMR material 1602 is deposited using shadow growth on the raised pillars in the patterned seed layer 1502. Growth is shadowed when the raised pillars 1502 have sufficiently high aspect ratios to prevent (by shadowing) any growth in the regions between pillars 1502. The deposition of the HAMR storage medium 1602 is done at high temperatures, typically 300 to 700° C. and nucleation is preferentially on the tops of the pillars 1502—this is a key difference between the method of the present invention and low temperature deposition processes for patterned PMR storage media. For the first embodiment, the sizes and shapes of the patterned pillars 1502 control the sizes and shape of the magnetic grains 1602.

Figure 17:
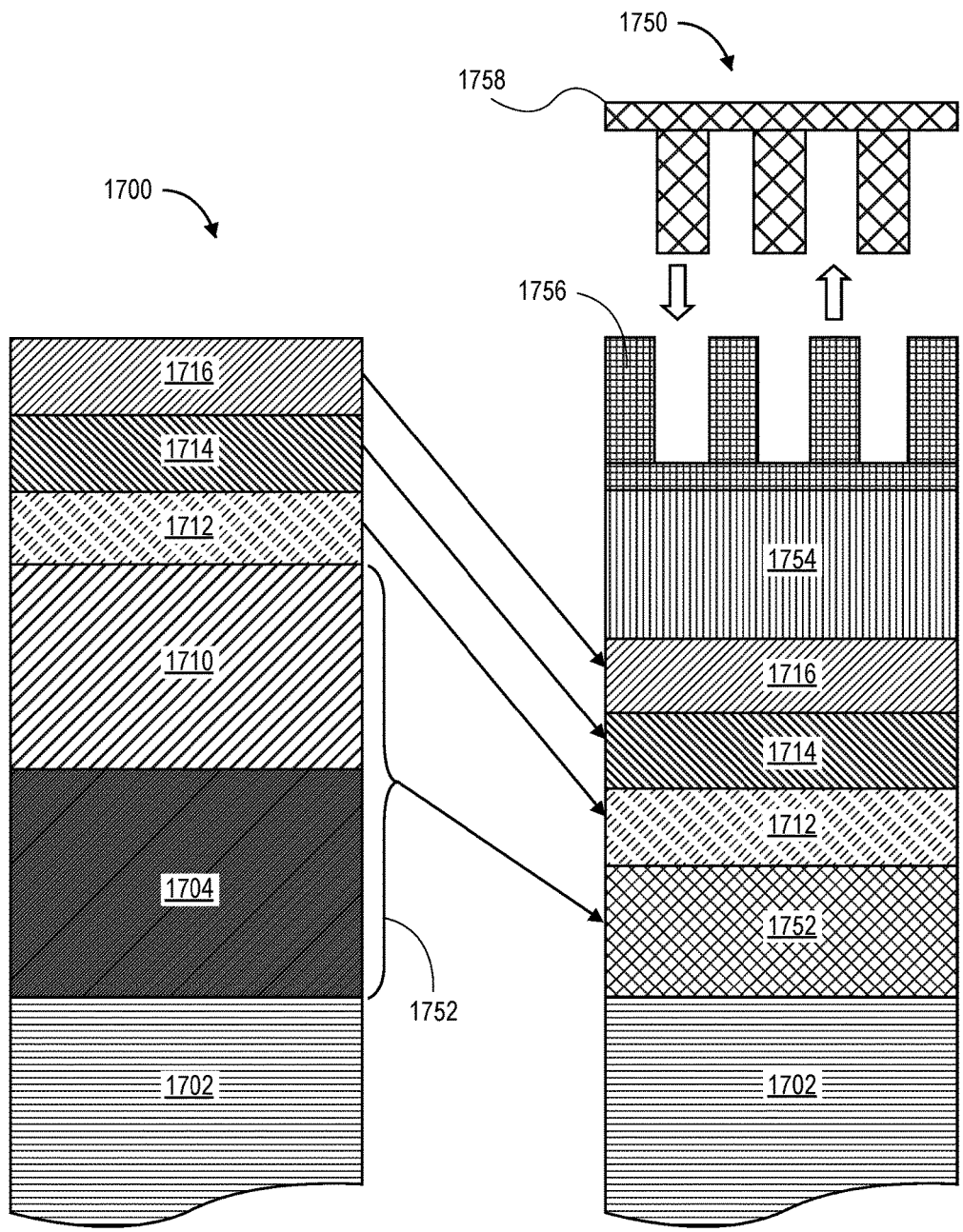
FIG. 17 is a schematic diagram of initial steps in a templated growth process for a HAMR storage medium with a patterned metal seed layer.

FIGS. 17-19: Second Embodiment

FIG. 17 is schematic diagram of the initial steps 1700 and 1750 in a templated growth process for a HAMR storage medium with a patterned metal seed layer, corresponding to a second embodiment of the present invention. A high temperature glass substrate 1702 forms a surface upon which an adhesion layer 1704 is grown, typically comprising 10 to 200 nm of an amorphous adhesion layer material, CrTa, NiTa, or an amorphous soft underlayer (SUL)-like material such as CoFeZrB, CoTaZr, CoCrZr, CoFeTaZr, CoFeZrBW, or any combination of these materials. Next a very thin seed or onset layer may optionally be deposited prior to depositing heat sink layer 1710, typically comprising 5 to 200 nm of Ag, Al, Cu, Cr, Au, NiAl, NiTa, Ru, RuAl, W, Mo, Ta or any combination of these materials. The two layers 1704 and 1710 are collectively shown as a first underlayer stack 1752 in view 1750.

On top of layer 1710, a 2 to 50 nm layer 1712 of (002) oriented MgO followed by a 3 to 20 nm layer 1714 of (002) oriented TiN are deposited—both these depositions are typically at room temperature. The combination of layers 1712 and 1714 forms a second underlayer stack, wherein the second underlayer stack may comprise only layer 1712, only layer 1714, or both layers 1712 and 1714 or other layers or combinations of materials including (002) magnesium oxide, (002) titanium nitride, both (002) magnesium oxide and (002) titanium nitride, and/or combinations of materials including (002) strontium titanium-oxide, (002) magnesium titanium-oxide, and/or (002) magnesium oxide-silicon oxide. These materials may be co-deposited and/or deposited in sequential multilayer depositions to form the overall second underlayer stack.

Next an additional 3 to 50 nm metallic layer 1716 is formed from one or more successive deposition steps. In some embodiments, a first step deposits one or more metal layers of (002)-oriented Pt, Pd, Ir, Rh, Os, or FePt, wherein each layer may comprise one or more of these metals, and where there is no underlayer of CrRu, RuAl, etc., In other embodiments, a first step deposits an underlayer of (002)-oriented CrRu, RuAl, CrA, and/or RuA alloys (where A is another metal) followed by a second step to deposit one or more metal layers of (002)-oriented Pt, Pd, Ir, Rh, Os, or FePt wherein each layer may comprise one or more of these metals. The metal layer deposition is performed at elevated temperatures, typically at least 300° C. The metal layers for generating a patterned layer is the key difference between the structures illustrated in FIGS. 17-19 and the structures illustrated for the first embodiment in FIGS. 14-16. In order to achieve the necessary (002) orientation of these metal layers, deposition must be performed at high temperatures, typically at least 300° C. Advantages of using a metal such as Pt or Pd as the patterned seed layer, instead of the previously-used MgO and/or TiN, include 1) better wetting of the HAMR material, 2) an increase in etch rates of the metal layer relative to MgO or TiN seed layers to achieve higher aspect ratios, 3) increased etch depth enabling use of increased pillar heights (higher aspect ratios so that the magnetic layer will only nucleate on the upper surface), and 4) a reduction in pattern-transfer induced damage (better crystallinity) to the seed layer arising from shorter etch times (due to the higher metal etch rates) to produce better alignment of (002)-oriented grains (high $K_u$ is out-of-plane), thereby giving improved magnetic properties in the storage layer. In the structure of FIGS. 17-19, layer 1716 is patterned, instead of layer 1714 (corresponding to layer 1414 in FIG. 14). The combinations of materials described here for the second embodiment should produce a smooth surface (RMS<1 nm), have a high etch rate, and promote wettability of high uniaxial perpendicular anisotropy magnetic materials.

View 1750 in FIG. 17 shows a deposition of a hard mask layer 1754, which may comprise high density carbon, carbon nitride, boron nitride, silicon nitride, and/or silicon oxide, etc. as in FIG. 14. Following the deposition of hard mask layer 1754, a resist layer 1756 is deposited. Layer 1756 is then lithographically patterned (e.g., using imprint lithography) by a template 1758 as in FIG. 14.

FIG. 18 is a schematic diagram of an intermediate step 1800 in a templated growth process for a HAMR storage medium with a patterned metal seed layer 1802. Here, an etch step has been used to transfer the pattern in resist layer 1756 down through the hard mask layer 1754 and through the metal seed layer 1716 to form patterned metal seed layer 1802. After this patterning process is complete, the remainder of the resist layer 1756 and the hard mask layer 1754 are removed, exposing seed layer pillars 1802 comprising the original composition of layer 1716 and with the proper orientation for subsequent growth of the HAMR layer 1902 in FIG. 19.

FIG. 19 is a schematic diagram of the final step 1900 in a templated growth process for a HAMR storage medium with a patterned metal seed layer 1802. The HAMR material 1902 is deposited using shadowed growth on the raised pillars in the patterned metal seed layer 1802. Growth is shadowed when the raised pillars 1802 have sufficiently high aspect ratios to prevent (by shadowing) any growth in the regions between pillars 1802 (which would be onto the surface of layer 1714). The deposition of the HAMR storage medium 1902 is done at high temperatures, typically 300 to 700° C. and nucleation is preferentially on the tops of the pillars 1802—this elevated temperature is a key difference between the method of the present invention and low temperature deposition processes for patterned PMR storage media. For the second embodiment, the sizes and shapes of the patterned pillars 1802 control the sizes and shape of the magnetic grains 1902.

FIGS. 20-23: Third Embodiment

Figure 20:
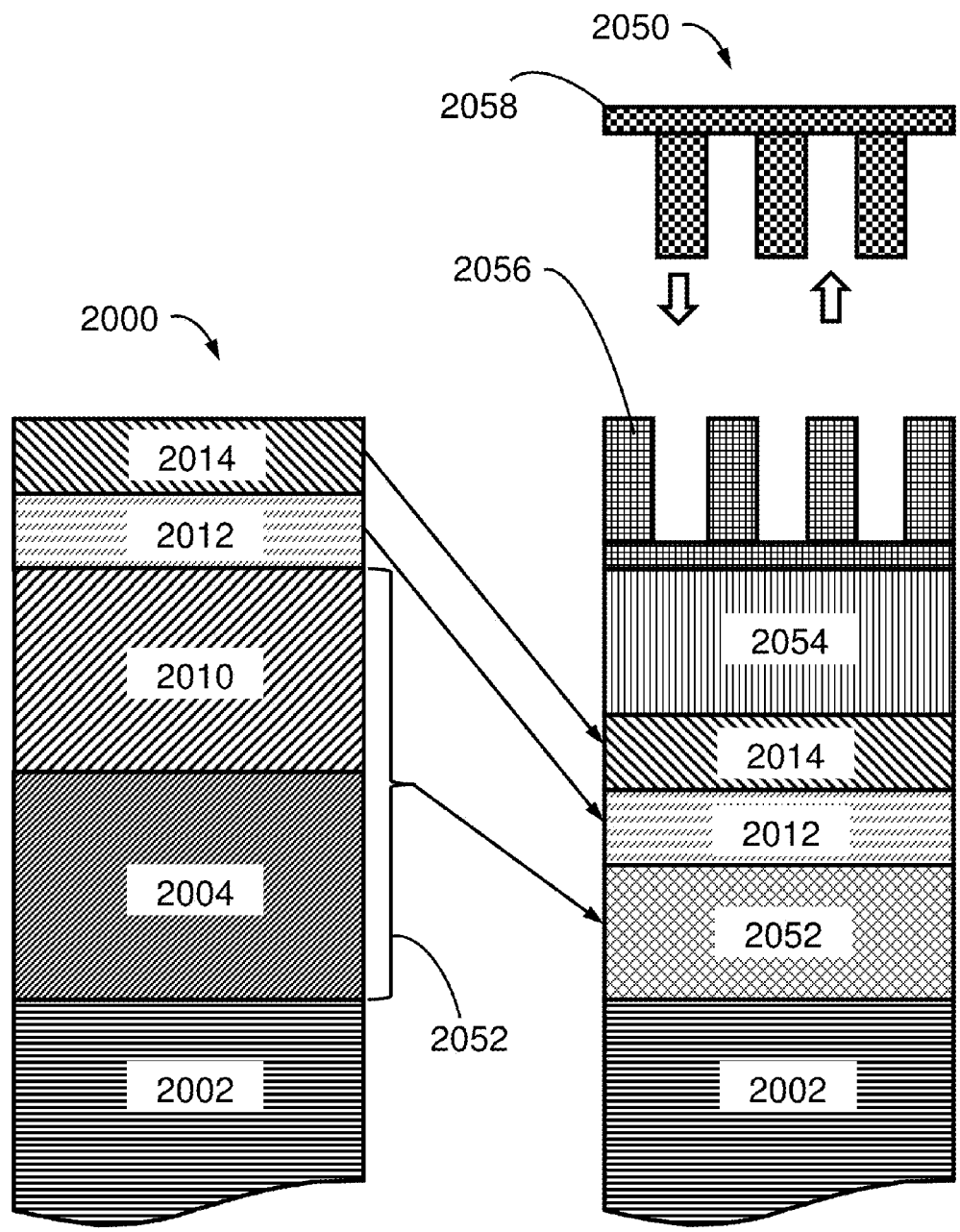
FIG. 20 is a schematic diagram of initial steps in a hole-tone templated growth process for a HAMR storage medium.

FIG. 20 is a schematic diagram of the initial steps 2000 and 2050 in a hole-tone templated growth process for a HAMR storage medium, corresponding to a third embodiment of the invention. In a hole-toned growth process, the HAMR storage medium grains are formed in the holes of the template, in contrast with the first and second embodiments where the data storage medium grains are formed on the seed layer pillars. A high temperature glass substrate 2002 forms the surface upon which an adhesion layer 2004 is grown, typically comprising 10 to 200 nm of an amorphous adhesion layer material, CrTa, NiTa, or an amorphous soft underlayer (SUL)-like material such as CoFeZrB, CoTaZr, CoCrZr, CoFeTaZr, CoFeZrBW, or any combination of these materials. Next a very thin seed or onset layer may optionally be deposited prior to depositing heat sink layer 2010, typically comprising 5 to 200 nm of Ag, Al, Cu, Cr, Au, NiAl, NiTa, Ru, RuAl, W, Mo, Ta or any combination of these materials. The two layers 2004 and 2010 are collectively shown as a first underlayer stack 2052 in view 2050. In this embodiment, the templating layer is between the heat sink layer and the HAMR storage medium layer.

On top of layer 2010, a 2 to 50 nm layer of (002) oriented MgO 2012 followed by a 3 to 20 nm layer of (002) oriented TiN 2014 are deposited—both these depositions are typically at room temperature. The combination of layers 2012 and 2014 forms a second underlayer stack, wherein the second underlayer stack may comprise only layer 2012, only layer 2014, both layers 2012 and 2014, or other layers or combinations of materials including (002) magnesium oxide, (002) titanium nitride, both (002) magnesium oxide and (002) titanium nitride, and/or combinations of materials including (002) strontium titanium-oxide, (002) magnesium titanium-oxide, and/or (002) magnesium oxide-silicon oxide. These materials may be co-deposited and/or deposited in sequential multilayer depositions to form the overall second underlayer stack. The structure could also comprise an additional 3 to 50 nm metallic layer (not shown) deposited onto layer 2014 using one or more successive deposition steps. In some embodiments, a first step deposits one or more metal layers of (002)-oriented Pt, Pd, Ir, Rh, Os, or FePt, wherein each layer may comprise one or more of these metals, and where there is no underlayer of CrRu, RuAl, etc. In other embodiments, a first step deposits an underlayer of (002)-oriented CrRu, RuAl, CrA, and/or RuA alloys (where A is another metal) followed by a second step to deposit one or more metal layers of (002)-oriented Pt, Pd, Ir, Rh, Os, or FePt wherein each layer may comprise one or more of these metals. The metal layer deposition is performed at elevated temperatures, typically at least 300° C. The combinations of materials described here for the third embodiment should produce a smooth surface (RMS<1 nm), and promote wettability of high uniaxial perpendicular anisotropy magnetic materials.

View 2050 in FIG. 20 shows a deposition of a template material (TM) layer 2054. Template material layer may comprise high density carbon, carbon nitride, boron nitride, silicon nitride, and/or silicon oxide or other hard mask material layers that are also segregants, such as high density carbon, carbon nitride, boron nitride, silicon nitride, silicon oxide, titanium oxide, boron oxide, and other nitrides, oxides, borides and/or carbides for FePt (or other high $K_u$ magnetic materials). Next, a resist layer 2056 is deposited. Layer 2056 is then lithographically patterned using a template 2058, also as in FIGS. 14 and 17.

Figure 21:
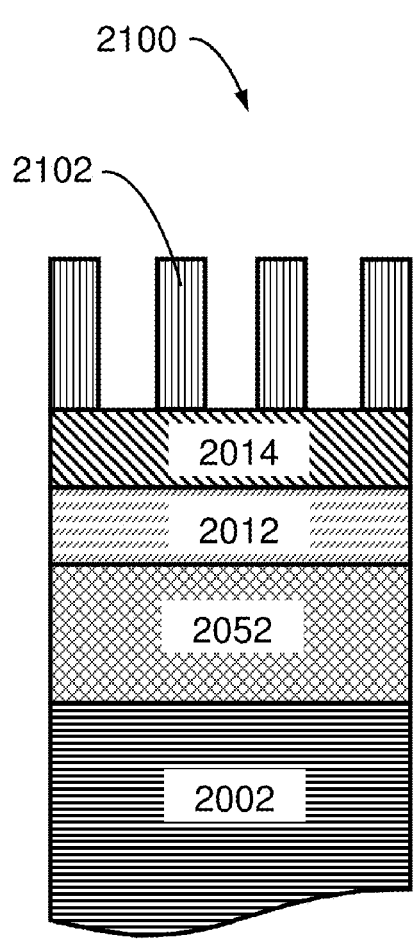
FIG. 21 is a schematic diagram of an intermediate step in a hole-tone templated growth process for a HAMR storage medium.

FIG. 21 is a schematic diagram of an intermediate step 2100 in a hole-tone templated growth process for a HAMR storage medium. Here, the pattern in resist layer 2056 has been transferred into the TM layer 2054, typically using a reactive ion etch (RIE) process, to form hole-tone patterned template layer 2102. The hole-tone template 2102 corresponds to a structure with an ordered array of holes over a textured seed layer 2014, rather than the pillars in the first and second embodiments. The use of a hole-tone template distinguishes the third embodiment from the first and second embodiments. After this patterning process is complete, the remainder of the resist layer 2056 is removed, exposing walls 2102 which may comprise high density carbon, carbon nitride, boron nitride, silicon nitride, silicon oxide, boron oxide, titanium oxide, and other nitrides, oxides, borides and/or carbides—these walls 2102 surround holes into which the magnetic storage medium grains 2204 will be formed in FIG. 22, rather than on top of the pillars as in the first and second embodiments. The materials in the walls 2102 must be capable of withstanding the high temperatures required for deposition of HAMR storage media. In this embodiment of the present invention, the contrast is reversed relative to the patterning technique in FIGS. 14-19.

High temperature surface diffusion of the deposited HAMR storage medium 2204, deposited typically at 300 to 700° C., facilitates growth of grains 2204 of magnetic material within the holes of the template 2102, wherein the crystallographic orientation is controlled by the underlying seed layer 2014 or by an optional additional metal seed layer which is deposited on top of layer 2014 (which then does not function as the seed layer), typically comprised of (002) TiN, MgO, SrTiO$_3$, MgTi-oxide, and/or MgO$_x$—SiO$_x$. The structure could also comprise an additional 3 to 50 nm metallic layer (not shown) deposited onto layer 2014, of one or more layers of (002)-oriented Pt, Pd, Ir, Rh, Os, or FePt or a combination of (002)-oriented CrRu, RuAl, CrA, and/or RuA alloys (where A is another metal) followed by one or more layers of (002)-oriented Pt, Pd, Ir, Rh, Os, or FePt in which the deposition must be performed at high temperatures, typically at least 300° C. The shapes and sizes of the grains are controlled by shapes and sizes of the holes in the template 2102. Dewetting of HAMR material from the template may facilitate diffusion of the HAMR material into the holes, increasing the heights of the individual magnetic storage locations. The template 2102 may comprise high density carbon, carbon nitride, boron nitride, silicon nitride, silicon oxide, boron oxide, titanium oxide, and other nitrides, oxides, borides and/or carbides.

Figure 22:
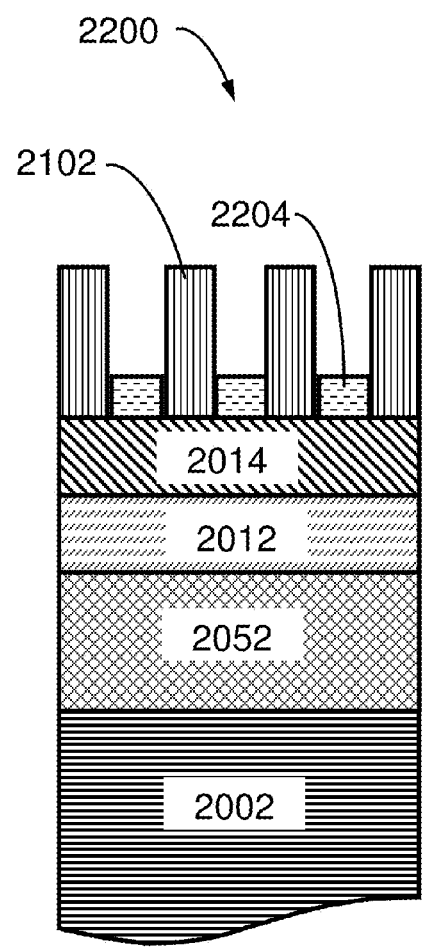
FIG. 22 is a schematic diagram of a final step in a hole-tone templated growth process for a HAMR storage medium.

FIG. 22 is a schematic diagram of one possible final step 2200 in a hole-tone templated growth process for a HAMR storage medium. The HAMR material is deposited at temperatures between 300 and 700° C. into the holes formed in the template layer 2102—thus the dimensions of the FePt grains are defined by the holes (thus the term "hole-tone template") and the crystallographic orientation of the FePt grains will be determined by the underlying seed layer 2014 which is unpatterned and thus has not been affected by potential pattern-transfer process defect generation. In this embodiment of the invention, the two functions of defining magnetic grain dimensions and shape, and crystallographic orientation control are separated: layer 2102 determines the magnetic grain dimensions/shape, while layer 2014 controls the crystal orientation of the HAMR storage medium grains.

Suitable materials for the hole tone template matrix layer comprise hard mask materials: high density carbon, carbon nitride, boron nitride, silicon nitride, and/or silicon oxide, and natural segregants for FePt or other high $K_u$ magnetic materials such as C, SiO$_x$, TiO$_x$, SiN$_x$, BN$_x$, B$_2$O$_3$ and other nitrides, oxides, borides, and/or carbides. Advantages of the hole tone template structure include: 1) the sole use of an RIE pattern transfer process from the resist 2056 into the template material 2054, thereby reducing damage to the seed layer that may occur due to ion beam milling in the pattern transfer process—this reduced damage may improve the quality of the epitaxial growth process and the crystalline orientation of the HAMR storage medium grains, 2) removal of the template (see FIG. 23) after HAMR material deposition allows complete segregation of HAMR medium islands without the need for segregants, however segregants can also be used.

Figure 23:
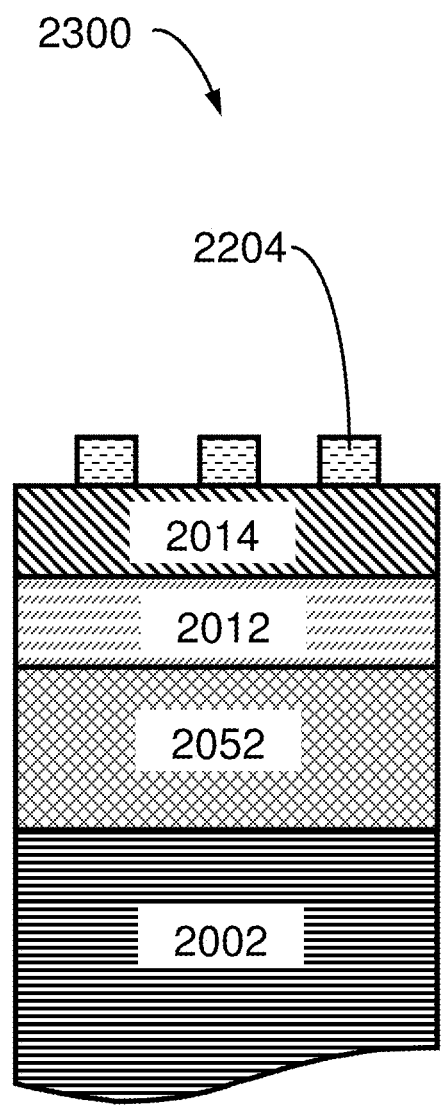
FIG. 23 is a schematic diagram of an alternative final step in a hole-tone templated growth process for a HAMR storage medium.

FIG. 23 is a schematic diagram of an alternative final step 2300 in a hole-tone templated growth process for a HAMR storage medium, comprising an additional step following FIG. 22 in which the hole tone template layer 2102 has been removed, leaving magnetic grains 2204 separated by gaps, instead of the walls 2102 in the template material.

Figure 24:
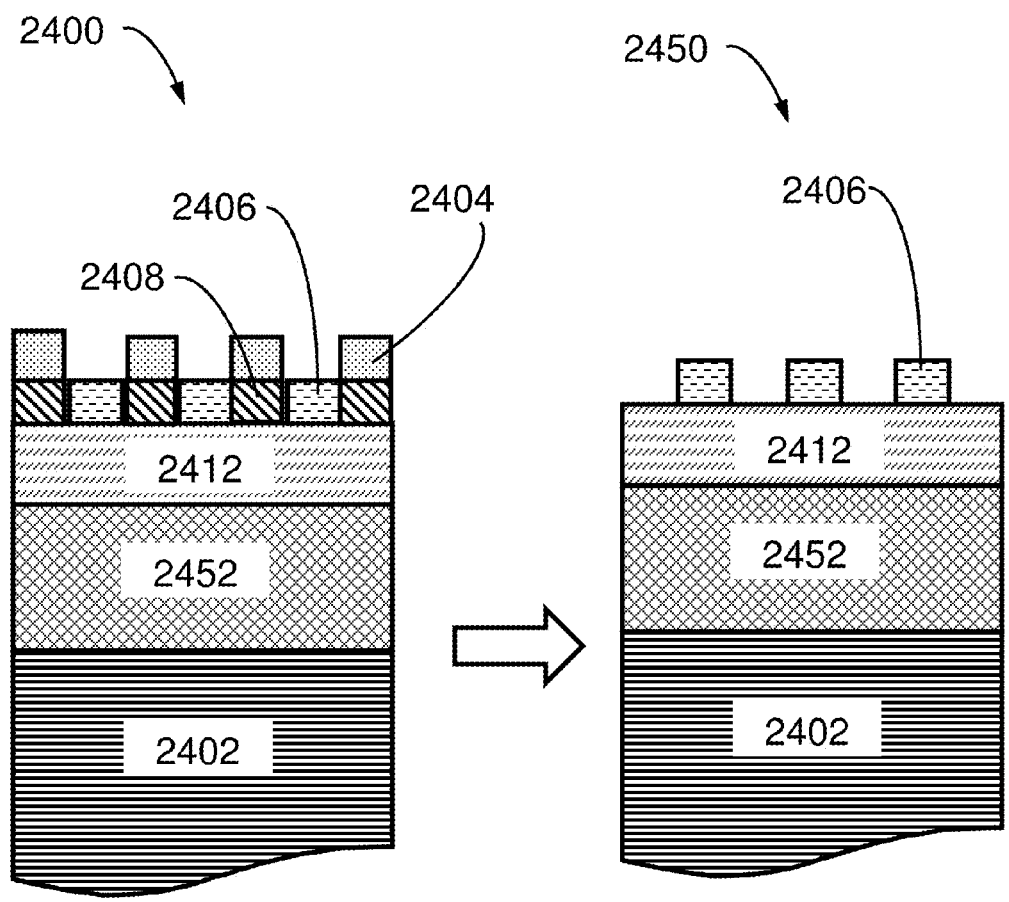
FIG. 24 is a schematic diagram of a step in a hybrid templated growth process for a HAMR storage medium.
Figure 25:
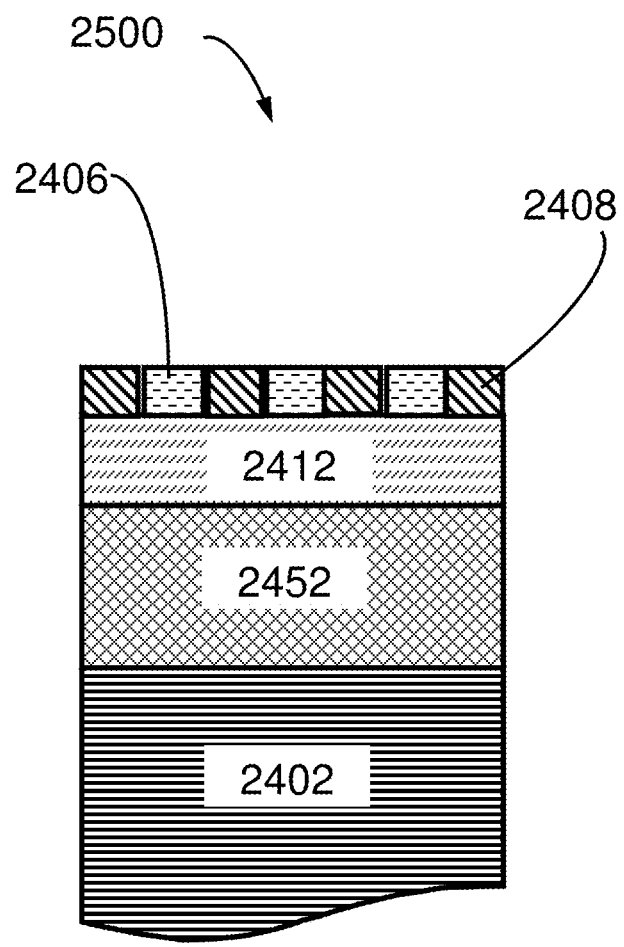
FIG. 25 is a schematic diagram of an alternative final step in the hybrid templated growth process of FIG. 24.

FIGS. 24-25: Fourth Embodiment

FIG. 24 is a schematic diagram 2400 of steps in a hybrid templated growth process for a HAMR storage medium, corresponding to a fourth embodiment of the invention which is similar to the first and second embodiments except that the seed layer islands have a lower aspect ratio which does not cause shadowing of the HAMR layer deposition. The preceding process steps before the steps shown in FIG. 24 are similar to those shown for the first and second embodiments in FIGS. 14-19 except as explained below. View 2400 in FIG. 24 corresponds to FIG. 16 with these correspondences: glass substrate 2402 (FIG. 16: 1402), first underlayer stack 2452 (FIG. 16: 1452), and MgO layer 2412 (FIG. 16: 1412). The HAMR storage material is deposited 2404 at high temperatures, typically 300 to 700° C. on the raised islands 2408 of the patterned seed layer as well as into the holes formed by the raised islands 2408 onto the underlying seed layer 2412. Note that here the aspect ratio of features 2408 is lower than for features 1502 in FIGS. 15 and 18, thus magnetic material 2406 is deposited between features 2408 and also deposited 2404 on top of features 2408—this occurs because the shadowing effect which prevented deposition of magnetic material between features 1502 in FIGS. 15 and 18 is much less pronounced here. The HAMR material 2404 is polycrystalline since template 2408 is not as good a seed layer as layer 2412 due to surface damage occurring during processing, while HAMR material 2406 has less processing damage hence better crystallinity with an (002) orientation controlled by (002) seed layer 2412. In some embodiments, layer 2408 may comprise (002) TiN and seed layer 2412 may comprise (002) MgO. In other embodiments, layer 2408 may comprise a metal and layer 2412 may comprise (002) TiN. The structure may also comprise an additional 3 to 50 nm metallic layer formed from one or more successive deposition steps. In some embodiments, a first step deposits one or more metal layers of (002)-oriented Pt, Pd, Ir, Rh, Os, or FePt, wherein each layer may comprise one or more of these metals, and where there is no underlayer of CrRu, RuAl, etc. In other embodiments, a first step deposits an underlayer of (002)-oriented CrRu, RuAl, CrA, and/or RuA alloys (where A is another metal) followed by a second step to deposit one or more metal layers of (002)-oriented Pt, Pd, Ir, Rh, Os, or FePt wherein each layer may comprise one or more of these metals. The metal layer deposition is performed at elevated temperatures, typically at least 300° C.

View 2450 in FIG. 24 illustrates the hybrid component of the growth process illustrated in view 2400. Following view 2400, the polycrystalline HAMR material 2404, which would not be a good magnetic data storage material since its poor crystallinity leads to misaligned grains (high $K_u$ axis is not aligned out-of-plane), may be removed by a lift off process in which the patterned layer 2408 is removed, thereby removing depositions 2404.

FIG. 25 shows an alternative final step for the fourth embodiment in which the polycrystalline FePt 2404 has been removed by a planarization process that polishes off the raised polycrystalline FePt layer 2404 while leaving the recessed crystalline FePt 2406 and the patterned template layer 2408 unpolished. A third selective removal method may be a chemically-selective etch process. For any of the cases in views 2450 and 2500, the recessed crystalline HAMR material regions 2406 remain as chemically-isolated, magnetic data storage islands.

FIGS. 26-29: Fifth Embodiment

Figure 26:
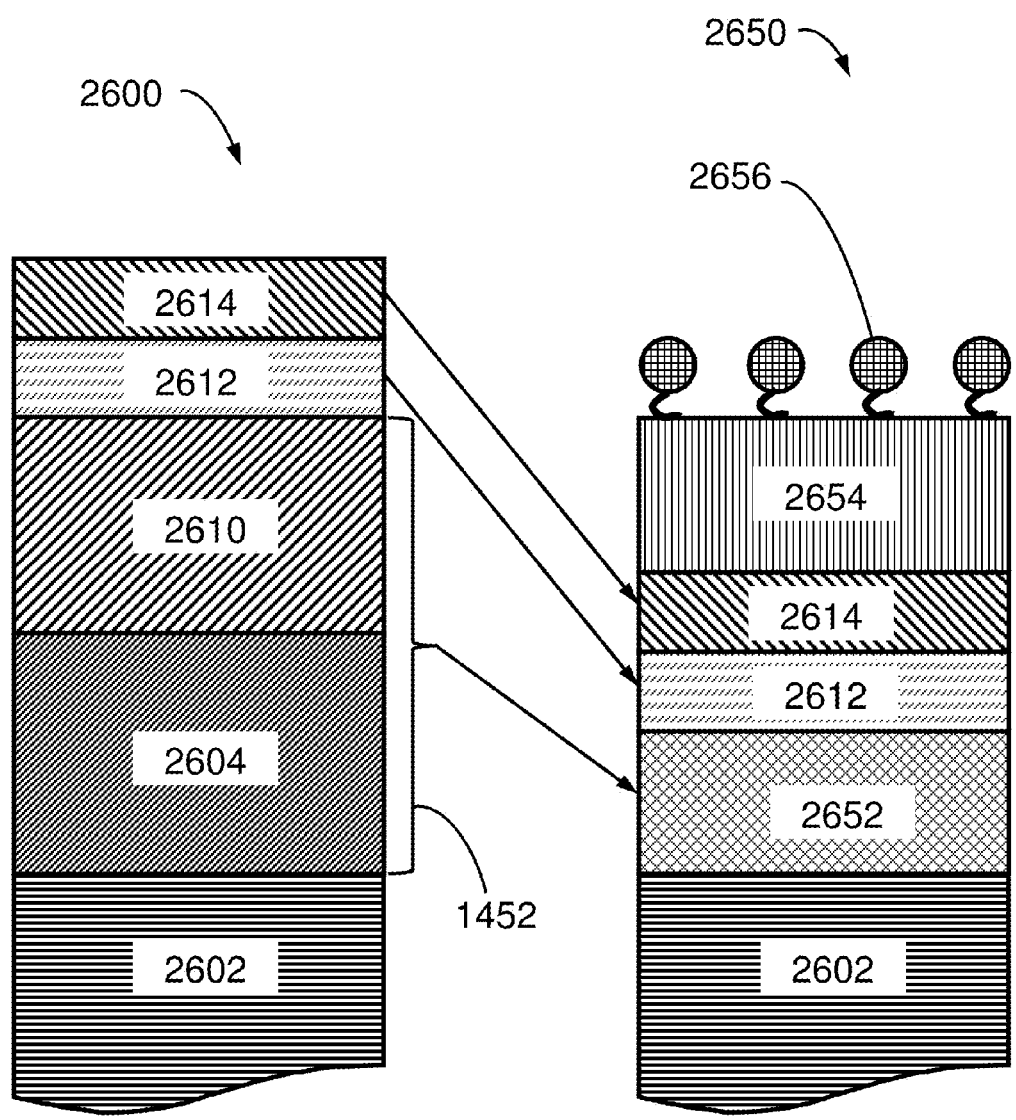
FIG. 26 is a schematic diagram of first steps in a growth process using nanoparticle arrays for generating topography for use in a templated growth process for a HAMR storage medium.

FIG. 26 is schematic diagram of the initial steps 2600 and 2650 in a templated growth process for a HAMR storage medium with a patterned (002)-oriented seed layer, corresponding to a fifth embodiment of the present invention. This embodiment is similar to the first, second, third, and fourth embodiments in FIGS. 14-25, except that an array of nanoparticles is used for the patterning of the hard mask, instead of a resist layer patterned with lithographic methods.

A high temperature glass substrate 2602 forms a surface upon which an adhesion layer 2604 is grown, typically comprising 10-200 nm of an amorphous adhesion layer material, CrTa, NiTa, or an amorphous soft underlayer (SUL)-like material such as CoFeZrB, CoTaZr, CoCrZr, CoFeTaZr, CoFeZrBW, or any combination of these materials. Next a very thin seed or onset layer may optionally be deposited prior to depositing a 5 to 200 nm heat sink layer 2610, typically comprising 5 to 200 nm of Ag, Al, Cu, Cr, Au, NiAl, NiTa, Ru, RuAl, W, Mo, Ta or any combination of these materials. The two layers 2604 and 2610 are collectively shown as a first underlayer stack 2652 in view 2650. On top of layer 2610, a 2 to 50 nm layer 2612 of (002) oriented MgO followed by a 3 to 20 nm layer 2614 of (002) oriented TiN are deposited—both these depositions are typically at room temperature. The combination of layers 2612 and 2614 forms a second underlayer stack, wherein the second underlayer stack may comprise only layer 2612, only layer 2614, or both layers 2612 and 2614 or other layers or combinations of materials including (002) magnesium oxide, (002) titanium nitride, both (002) magnesium oxide and (002) titanium nitride, and/or combinations of materials including (002) strontium titanium-oxide, (002) magnesium titanium-oxide, and/or (002) magnesium oxide-silicon oxide. The structure may also comprise an additional 3 to 50 nm metallic layer formed from one or more successive deposition steps. In some embodiments, a first step deposits one or more metal layers of (002)-oriented Pt, Pd, Ir, Rh, Os, or FePt, wherein each layer may comprise one or more of these metals, and where there is no underlayer of CrRu, RuAl, etc. In other embodiments, a first step deposits an underlayer of (002)-oriented CrRu, RuAl, CrA, and/or RuA alloys (where A is another metal) followed by a second step to deposit one or more metal layers of (002)-oriented Pt, Pd, Ir, Rh, Os, or FePt wherein each layer may comprise one or more of these metals. The metal layer deposition is performed at elevated temperatures, typically at least 300° C.

View 2650 in FIG. 26 shows a deposition of a hard mask layer 2654 which may comprise high density carbon, corresponding to carbon with a higher degree of $sp^3$ bonding (and a correspondingly lower degree of $sp^2$ bonding) which has characteristically higher etch contrast and higher density than more graphitic carbon (i.e., carbon with more $sp^2$ bonding). In addition to high density carbon, other possible materials for the hard mask layer comprise single layers or combinations of carbon nitride, boron nitride, silicon nitride, and/or silicon oxide. Following the deposition of hard mask layer 2654, a layer of nanoparticles 2656 is deposited. Layer 2656 performs the same patterning function as resist layer 1456 in FIG. 14, with the advantages that smaller grain diameters and grain pitches are possible, and no lithographic patterning step is required—the nanoparticles in layer 2656 are self-organizing into a monodisperse nanoparticle array.

Figures 27, 28:
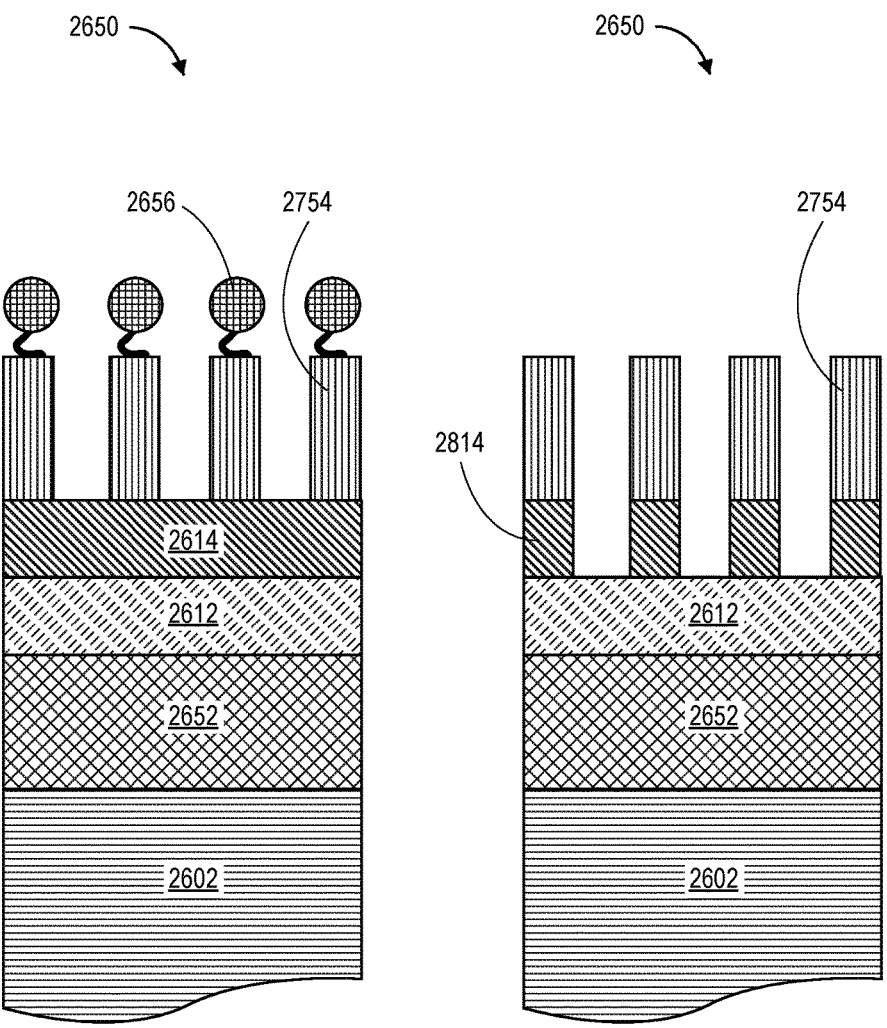
FIG. 27 is a schematic diagram of further steps in the process starting in FIG. 26.
FIG. 28 is a schematic diagram of next steps in the process of FIGS. 26 and 27.

FIG. 27 illustrates schematically a pattern transfer process in which the nanoparticles in layer 2656 form a mask to pattern the (unpatterned) hard mask layer 2654, typically using an RIE process which is highly anisotropic, and thus transfers the shapes of the nanoparticles with high spatial resolutions into layer 2654 as shown, thereby creating patterned hard mask layer 2754 from the remaining material out of the original (unpatterned) hard mask layer 2654.

FIG. 28 illustrates the next step in the fifth embodiment of the invention in which the layer 2656 of nanoparticles has been removed and another pattern transfer process has transferred the pattern in patterned hard mask layer 2754 into (unpatterned) seed layer 2614 to form patterned seed layer 2814. In an alternative embodiment, if a thin metal layer has been deposited on top of the second underlayer stack as described above, then this thin metal layer will function as the patterned seed layer instead of layer 2614.

Figure 29:
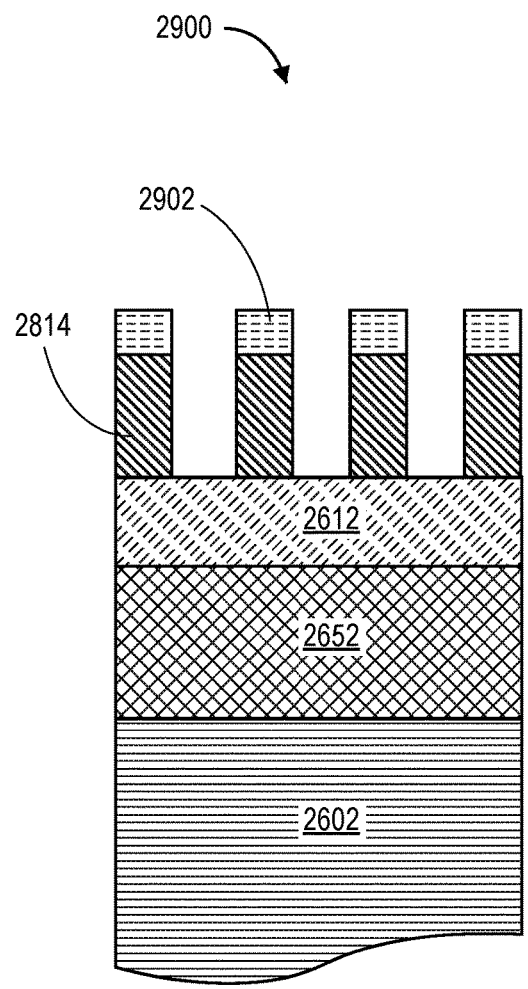
FIG. 29 is a schematic diagram of final steps in the process of FIGS. 26-28.

FIG. 29 shows schematically the final steps in a templated growth process for a HAMR storage medium with the patterned seed layer 2814, following the steps shown in FIGS. 26-28. The patterned hard mask layer 2754 has been removed, exposing a set of seed layer islands 2814, typically comprising (002) TiN, MgO, SrTiO$_3$, MgTi-oxide, MgO$_x$—SiO$_x$, Pt, Pd, Ir, Rh, Os, or FePt. The HAMR magnetic material is deposited 2902 using shadow growth on the islands 2814 in the seed layer. Growth is shadowed when the raised islands 2814 have sufficiently high aspect ratios to prevent (by shadowing) any growth in the regions between islands 2814 onto layer 2612. The deposition of the HAMR storage medium 2902 is done at high temperatures, typically 300 to 700° C. and nucleation is preferentially on the tops of the islands 2814—this is a key difference between the method of the present invention and low temperature deposition processes for patterned PMR storage media.

Alternative HAMR Storage Medium Materials

In the above description of embodiments of the invention, the magnetic material has been characterized as an Iron-Platinum (FePt) alloy, with $L1_0$ superlattice ordering formed in a high temperature A1 to $L1_0$ chemical ordering transition. Other magnetic alloys and chemical ordering transitions fall within the scope of the invention, including Iron-Palladium (FePd), Iron-Platinum-Silver (FePtAg), Iron-Platinum-Gold (FePtAu), Iron-Platinum-Copper (FePtCu), Iron-Platinum-Nickel (FePtNi), Manganese Aluminum (MnAl), wherein these alloys also undergo an A1 to $L1_0$ chemical ordering transition. Also within the scope of the invention are Cobalt-Platinum (CoPt) and Cobalt-Palladium (CoPd) alloys undergoing a high temperature A1 to $L1_1$ chemical ordering transition. Other magnetic compounds undergoing these, or similar, chemical ordering transitions may also fall within the scope of the invention. As is known in the art, hetero-expitaxial strain induced in these chemical ordered magnetic materials results in the high anisotropy direction being oriented perpendicular to the plane (see FIG. 10). Typical segregants may include C, SiO$_x$, TiO$_x$, SiN$_x$, BN$_x$, B$_2$O$_3$ and other nitrides, oxides, borides, and/or carbides.

Patterned Layers Relative to the Heat Sink Layer

For proper dissipation of heat (due to the HAMR process) from the data storage layer, it is typically necessary that the heat sink layer be a continuous film, i.e., that the heat sink layer not be patterned, since patterning of the heat sink layer would prevent the optimal three-dimensional dissipation of heat. In embodiments of the invention, the templating procedure may be applied to one or more layers, as long as all of these layers are above the heat sink layer. In some embodiments, the one or more patterned layers may extend down to just above the top surface of the heat sink layer. In some embodiments, the one or more patterned layers may extend up to the lower surface of the media layer.

Alternative Embodiments

Although embodiments have been described in the context of hard disk drives, it should be understood that various changes, substitutions and alterations can be made. Moreover, the scope of the present application is not intended to be limited to the particular embodiments of the process, machine, manufacture, or composition of matter, means, methods and steps described in the specification. As one of ordinary skill in the art will readily appreciate from the disclosure of embodiments, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method for generating high areal density heat assisted magnetic recording (HAMR) media using templated growth on a substrate, the method comprising the steps of:
   depositing an underlayer stack, wherein the underlayer stack comprises at least a pattern layer;
   patterning the pattern layer in the underlayer stack to form a patterned seed layer comprising pillars; and
   depositing HAMR magnetic material at high temperatures ranging from 300 to 700° C. onto the patterned seed layer to form a tightly distributed magnetic grain structure having a magnetic grain diametric distribution below 15% of a mean diameter, and wherein the deposition process for the magnetic material is shadowed to inhibit deposition of magnetic material-between the pillars;
   wherein the underlayer stack comprises one or more of the following materials: (002) magnesium oxide, (002) titanium nitride, both (002) magnesium oxide and (002) titanium nitride, and/or single layers or combinations of materials including (002) strontium titanium-oxide, (002) magnesium titanium-oxide, and/or (002) magnesium oxide-silicon oxide.

2. The method of claim 1, wherein the underlayer stack ranges from 1 to 70 nm in thickness and is deposited at a temperature ranging from room temperature to 300° C.

3. The method of claim 1, wherein the step of patterning the pattern layer in the underlayer stack to form the patterned seed layer comprises the steps of:
   depositing a resist layer;
   patterning the resist layer; and
   transferring the pattern in the resist layer to the pattern layer in the underlayer stack, thereby patterning the pattern layer in the underlayer stack into a patterned seed layer.

4. The method of claim 3, wherein the step of patterning the resist layer comprises imprint lithography.

5. The method of claim 1, wherein the step of patterning the pattern layer in the underlayer stack to form the patterned seed layer comprises the steps of:
   depositing a nanoparticle array layer; and
   transferring the pattern in the nanoparticle array layer to the pattern layer in the underlayer stack, thereby patterning the pattern layer in the underlayer stack into a patterned seed layer.

6. A method for generating high areal density heat assisted magnetic recording (HAMR) media using templated growth on a substrate, the method comprising the steps of:
   depositing an underlayer stack, wherein the underlayer stack comprises at least a pattern layer;
   depositing a metal layer onto the pattern layer in the underlayer stack at temperatures above 300° C.;

patterning the metal layer to form a patterned metal seed layer comprising pillars; and depositing HAMR magnetic material at high temperatures ranging from 300 to 700° C. onto the patterned metal seed layer to form a tightly distributed diametric magnetic grain structure, and wherein the deposition process for the magnetic material is shadowed to inhibit deposition of magnetic material between the pillars.

7. The method of claim 6, wherein the underlayer stack comprises one or more of the following materials: (002) magnesium oxide, (002) titanium nitride, both (002) magnesium oxide and (002) titanium nitride, and/or combinations of materials including (002) strontium titanium-oxide, (002) magnesium titanium-oxide, and/or (002) magnesium oxide-silicon oxide.

8. The method of claim 7, wherein the underlayer stack ranges from 1 to 70 nm in thickness and is deposited at a temperature ranging from room temperature to 300° C.

9. The method of claim 6, wherein the step of patterning the metal layer to form the patterned metal seed layer comprises the steps of:
depositing a resist layer;
patterning the resist layer; and
transferring the pattern in the resist layer to the metal layer, thereby patterning the metal layer into a patterned metal seed layer.

10. The method of claim 9, wherein the step of patterning the resist layer comprises imprint lithography.

11. The method of claim 6, wherein the step of patterning the metal layer to form the patterned metal seed layer comprises the steps of:
depositing a nanoparticle array layer; and
transferring the pattern in the nanoparticle array layer to the metal layer, thereby patterning the metal layer into a patterned metal seed layer.

12. The method of claim 6, wherein the step of depositing the metal layer comprises the steps of:
an optional first step depositing an underlayer of (002)-oriented CrRu, RuAl, CrA, and/or RuA alloys (where A is another metal); and
a second step depositing one or more metal layers of (002)-oriented Pt, Pd, Ir, Rh, Os, or FePt, wherein each metal layer of the one or more metal layers comprises one or more of these metals;
wherein the metal layer deposition is performed at elevated temperatures of at least 300° C.

13. The method of claim 12, wherein the metal layer ranges from 1 to 10 nm in thickness.

14. A method for generating high areal density heat assisted magnetic recording (HAMR) media using hole-tone templated growth on a substrate, the method comprising the steps of:
depositing an underlayer stack, wherein the underlayer stack comprises at least a pattern layer;
optionally depositing a metal layer at temperatures above 300° C. onto the pattern layer in the underlayer stack;
depositing a template material layer onto the pattern layer of the underlayer stack or onto the optional metal layer;
patterning the template material layer to form a hole-tone template;
depositing HAMR magnetic material at high temperatures ranging from 300 to 700° C. onto the template layer to form a tightly distributed diametric magnetic grain structure having a magnetic grain diametric distribution below 15% of a mean diameter, and the dimensions of holes in the hole-tone template determine the sizes and shapes of the magnetic grains; and
removing the hole-tone template.

15. The method of claim 14, wherein the underlayer stack comprises one or more of the following materials: (002) magnesium oxide, (002) titanium nitride, both (002) magnesium oxide and (002) titanium nitride, and/or single layers or combinations of materials including (002) strontium titanium-oxide, (002) magnesium titanium-oxide, and/or (002) magnesium oxide-silicon oxide.

16. The method of claim 15, wherein the underlayer stack ranges from 1 to 70 nm in thickness and is deposited at a temperature ranging from room temperature to 300° C.

17. The method of claim 14, wherein the step of patterning the template material layer to form the hole-tone template comprises the steps of:
depositing a resist layer;
patterning the resist layer; and
transferring the pattern in the resist layer to the template material layer, thereby patterning the template material layer into a hole-tone template.

18. The method of claim 17, wherein the step of patterning the resist layer comprises imprint lithography.

19. The method of claim 14, wherein the step of patterning the template material layer to form the hole-tone template comprises the steps of:
depositing a nanoparticle array layer; and
transferring the pattern in the nanoparticle array layer to the template material layer, thereby patterning the template material layer into a hole-tone template.

20. The method of claim 14, further comprising:
depositing the metal layer at temperatures above 300° C. onto the pattern layer in the underlayer stack, comprising the steps of:
an optional first step depositing an underlayer of (002)-oriented CrRu, RuAl, CrA, and/or RuA alloys, wherein A is another metal; and
a second step depositing one or more metal layers of (002)-oriented Pt, Pd, Ir, Rh, Os, or FePt, wherein each metal layer of the one or more metal layers comprises one or more of these metals;
wherein the metal layer deposition is performed at elevated temperatures of at least 300° C.

21. The method of claim 20, wherein the metal layer ranges from 1 to 10 nm in thickness.

* * * * *